(12) United States Patent
Kadomatsu

(10) Patent No.: US 9,874,940 B2
(45) Date of Patent: Jan. 23, 2018

(54) INPUT DISPLAY CONTROL DEVICE, THIN CLIENT SYSTEM, INPUT DISPLAY CONTROL METHOD, AND RECORDING MEDIUM

(71) Applicant: NEC Solutions Innovators, Ltd., Tokyo (JP)

(72) Inventor: Yasuki Kadomatsu, Tokyo (JP)

(73) Assignee: NEC Solution Innovators, LTD., Tokyo (JP)

( * ) Notice: Subject to any disclaimer, the term of this patent is extended or adjusted under 35 U.S.C. 154(b) by 343 days.

(21) Appl. No.: 14/427,842

(22) PCT Filed: Sep. 13, 2013

(86) PCT No.: PCT/JP2013/074861
§ 371 (c)(1),
(2) Date: Mar. 12, 2015

(87) PCT Pub. No.: WO2014/042247
PCT Pub. Date: Mar. 20, 2014

(65) Prior Publication Data
US 2015/0347006 A1 Dec. 3, 2015

(30) Foreign Application Priority Data
Sep. 14, 2012 (JP) .................................. 2012-203202

(51) Int. Cl.
*G06F 3/02* (2006.01)
*G06F 3/0488* (2013.01)
(Continued)

(52) U.S. Cl.
CPC ................ *G06F 3/02* (2013.01); *G06F 3/041* (2013.01); *G06F 3/04886* (2013.01);
(Continued)

(58) Field of Classification Search
CPC .......... G06F 3/041; G06F 3/023; G06F 3/048; G06F 3/0488; G06F 3/04886; G06F 3/02;
(Continued)

(56) References Cited

U.S. PATENT DOCUMENTS

| 5,581,243 A | 12/1996 | Ouellette et al. |
| 5,638,501 A | 6/1997 | Gough et al. |

(Continued)

FOREIGN PATENT DOCUMENTS

| CN | 1505778 A | 6/2004 |
| JP | 07-006013 A | 1/1995 |

(Continued)

OTHER PUBLICATIONS

Chinese Office Action issued by the Patent Office of the People's Republic of China for Application No. 2013800478089 dated Aug. 31, 2016 (12 pages).

(Continued)

*Primary Examiner* — Tadeese Hailu
(74) *Attorney, Agent, or Firm* — Wilmer Cutler Pickering Hale & Dorr

(57) ABSTRACT

A display control unit (15) in an input display control device (1) displays an image including a symbol display area in which a symbol input by a user is displayed, on the screen of a display unit (11). The display control unit (15) also displays operation buttons and symbols allocated to the operation buttons on the screen of the display unit (11) while being superimposed on the image displayed by the display control unit (15), the operation buttons being arrayed in a virtual keyboard through which a symbol to be displayed in the symbol display area is input through tapping on the display unit (11), the operation buttons being translucently displayed. The display control unit (15) also changes a display color of the symbols allocated to the operation (Continued)

buttons arrayed in the virtual keyboard to a display color selected from a plurality of display colors set in advance.

7 Claims, 12 Drawing Sheets

(51) Int. Cl.
  *G06T 11/00* (2006.01)
  *G06F 3/041* (2006.01)
(52) U.S. Cl.
  CPC .. *G06T 11/001* (2013.01); *G06F 2203/04804* (2013.01); *G06T 2200/16* (2013.01)
(58) Field of Classification Search
  CPC ......... G06F 2203/04804; G06F 3/0219; G06F 1/1671; G09G 2340/12; G09G 5/14; H04N 1/00411; H04N 1/00413
  See application file for complete search history.

(56) References Cited

U.S. PATENT DOCUMENTS

| | | | |
|---|---|---|---|
| 6,121,960 A | 9/2000 | Carroll et al. | |
| 6,130,665 A | 10/2000 | Ericsson | |
| 6,501,464 B1 | 12/2002 | Cobbley et al. | |
| 2005/0212763 A1* | 9/2005 | Okamura | G06F 3/04886 345/156 |
| 2006/0167935 A1* | 7/2006 | Atarashi | G01C 21/32 |
| 2010/0177035 A1* | 7/2010 | Schowengerdt | G06F 1/163 345/156 |
| 2010/0323762 A1 | 12/2010 | Sindhu | |
| 2011/0264442 A1* | 10/2011 | Huang | G06F 3/04886 704/9 |
| 2011/0302520 A1 | 12/2011 | Yuasa et al. | |
| 2012/0062465 A1* | 3/2012 | Spetalnick | G06F 3/0236 345/168 |
| 2012/0149477 A1* | 6/2012 | Park | G06F 3/0202 463/43 |
| 2012/0274658 A1* | 11/2012 | Chung | G06F 3/04886 345/629 |
| 2013/0002561 A1* | 1/2013 | Wakasa | G06F 3/018 345/168 |
| 2013/0002562 A1* | 1/2013 | Leskela | G06F 3/04886 345/169 |
| 2015/0067573 A1 | 3/2015 | Seo | |

FOREIGN PATENT DOCUMENTS

| | | |
|---|---|---|
| JP | H08-211860 A | 8/1996 |
| JP | 2003-067098 A | 3/2003 |
| JP | 2004-343662 A | 12/2004 |
| JP | 2007-183787 A | 7/2007 |
| JP | 2010-117205 A | 5/2010 |
| JP | 2011-254358 A | 12/2011 |
| KR | 10-2012-0046807 A | 5/2012 |
| KR | 101169374 B1 | 7/2012 |
| WO | WO-99/50737 A1 | 10/1999 |

OTHER PUBLICATIONS

Korean Office Action issued in corresponding Korean Application No. 10-2015-7005809, dated Mar. 2, 2016, 16 pages.
Japanese Office Action issued by the Japan Patent Office for Application No. 2012-203202 dated Sep. 3, 2013 (5 pages).
International Search Report corresponding to PCT/JP2013/074861 dated Dec. 17, 2013 (2 pages).

* cited by examiner

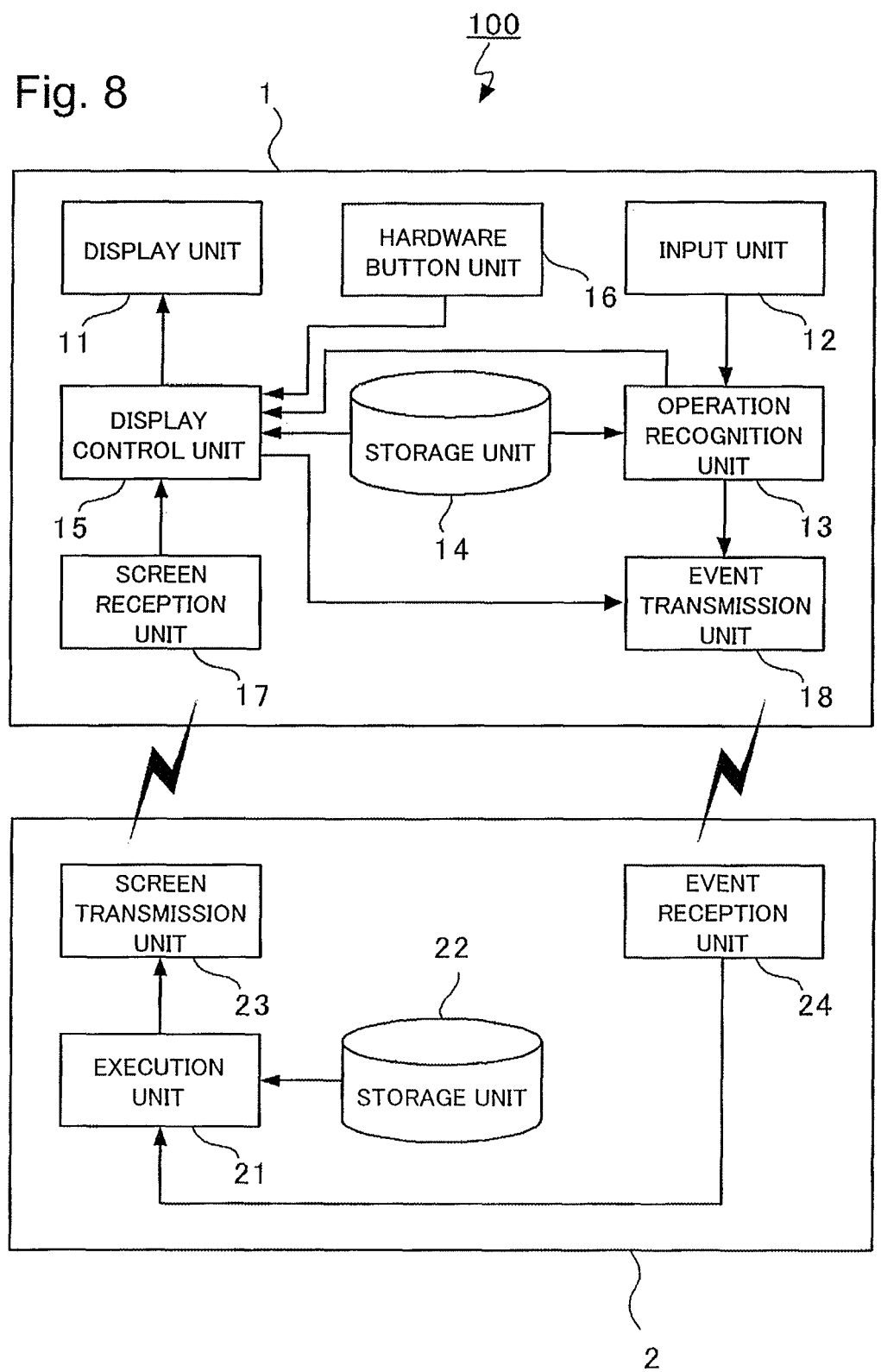

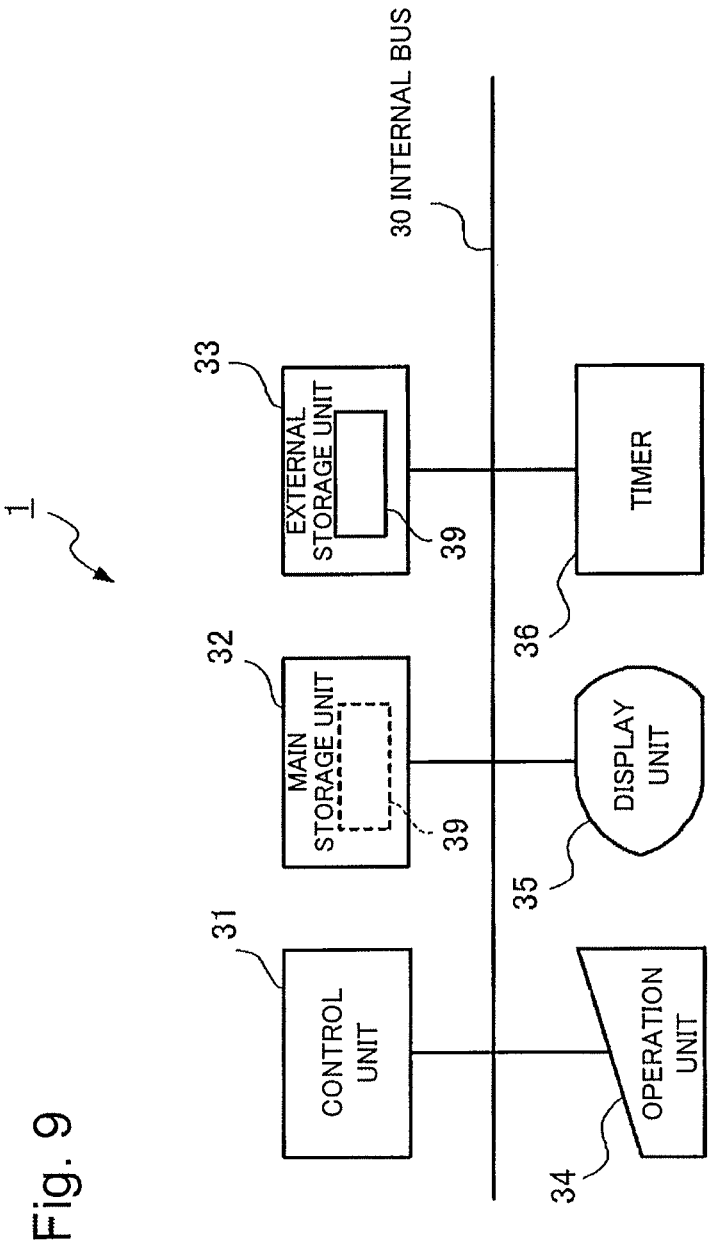

ical Problem

INPUT DISPLAY CONTROL DEVICE, THIN CLIENT SYSTEM, INPUT DISPLAY CONTROL METHOD, AND RECORDING MEDIUM

CROSS-REFERENCE TO RELATED APPLICATIONS

This application is a national stage application of International Application No. PCT/JP2013/074861 entitled "Input Display Control Device, Thin Client System, Input Display Control Method, and Recording Medium," filed on Sep. 13, 2013, which claims the benefit of the priority of Japanese Patent Application No. 2012-203202, filed on Sep. 14, 2012, the disclosures of each of which are hereby incorporated by reference in their entirety.

TECHNICAL FIELD

The present invention relates to an input display control device, a thin client system, an input display control method, and a recording medium.

BACKGROUND ART

Some apparatuses, such as an image reading apparatus described in PTL 1, display a keyboard screen (virtual keyboard), for a user to input characters and the like, while being superimposed on part of a text input area, for displaying the characters and the like input by the user, and still allow the user to visually check the text input area.

The image reading apparatus described in PTL 1 translucently displays the keyboard screen. Thus, the user can visually check the entire text input area even when the keyboard screen is displayed to be superimposed on the part of the text input area.

CITATION LIST

Patent Literature

[PTL 1] Japanese Patent Application Publication No. 2011-254358

SUMMARY OF INVENTION

Technical Problem

However, the keyboard screen in the same or a similar color as a displayed underlying image for example, offers the user low visibility. Thus, there is a problem in that a keyboard screen (virtual keyboard) might offer the user low visibility and thus low operability depending on the display color.

In view of the above situation, a main object of the present invention is to provide an input display control device, a thin client system, an input display control method, and a recording medium capable of preventing a virtual keyboard, displayed while being superimposed on a displayed image, from having low visibility.

Solution to Problem

An input display control device according to a first aspect of the present invention includes:
a touch panel display;
screen displaying means for displaying an image including a symbol display area in which a symbol input by a user is displayed, on a screen of the touch panel display;
keyboard displaying means for displaying operation buttons and symbols allocated to the operation buttons on the screen of the touch panel display while being superimposed on the image displayed by the screen displaying means, the operation buttons being arrayed in a virtual keyboard through which a symbol to be displayed in the symbol display area is input through tapping on the touch panel display, the operation buttons being translucently displayed; and
display color changing means for changing a display color of the symbols allocated to the operation buttons arrayed in the virtual keyboard displayed by the keyboard displaying means to a display color selected from a plurality of display colors set in advance.

A thin client system according to a second aspect of the present invention includes:
a server; and
an input display control device including a touch panel display,
the server and the input display control device being connected to each other through a network,
the server including image transmitting means for transmitting image information for generating an image to be displayed on a screen of the touch panel display to the input display control device,
the input display control device including:
  image receiving means for receiving the image information from the server;
  screen displaying means for displaying an image including a symbol display area in which a symbol input by a user is displayed, on the screen of the touch panel display, based on the image information received by the image receiving means;
  keyboard displaying means for displaying operation buttons and symbols allocated to the operation buttons on the screen of the touch panel display while being superimposed on the image displayed by the screen displaying means, the operation buttons being arrayed in a virtual keyboard through which a symbol to be displayed in the symbol display area is input through tapping on the touch panel display, the operation buttons being translucently displayed; and
  display color changing means for changing a display color of the symbols allocated to the operation buttons arrayed in the virtual keyboard displayed by the keyboard displaying means to a display color selected from a plurality of display colors set in advance.

An input display control method according to a third aspect of the present invention is an input display control method performed by an input display control device including a touch panel display, the input display control method including:
a screen display step for displaying, by the input display control device, an image including a symbol display area in which a symbol input by a user is displayed, on a screen of the touch panel display;
a keyboard display step for displaying, by the input display control device, operation buttons and symbols allocated to the operation buttons on the screen of the touch panel display while being superimposed on the image displayed in the screen display step, the operation buttons being arrayed in a virtual keyboard through which a symbol to be displayed in the symbol display area is input through tapping on the touch panel display, the operation buttons being translucently displayed; and a display color changing step for changing, by the input display control device, a display color of the symbols allocated to the operation buttons arrayed in the virtual keyboard displayed in the keyboard displaying step to a display color selected from a plurality of display colors set in advance.

An input display control method according to a fourth aspect of the present invention is an input display control method performed by a thin client system including a server and an input display control device including a touch panel display, the server and the input display control device being connected to each other through a network, the input display control method including:

by the server, an image transmitting step for transmitting image information for generating an image to be displayed on a screen of the touch panel display to the input display control device;

by the input display control device, an image receiving step for receiving the image information from the server;

a screen displaying step for displaying an image including a symbol display area in which a symbol input by a user is displayed, on the screen of the touch panel display, based on the image information received in the image receiving step;

a keyboard displaying step for displaying operation buttons and symbols allocated to the operation buttons on the screen of the touch panel display while being superimposed on the image displayed in the screen displaying step, the operation buttons being arrayed in a virtual keyboard through which a symbol to be displayed in the symbol display area is input through tapping on the touch panel display, the operation buttons being translucently displayed; and a display color changing step for changing a display color of the symbols allocated to the operation buttons arrayed in the virtual keyboard displayed in the keyboard displaying step to a display color selected from a plurality of display colors set in advance.

A recording medium according to a fifth aspect of the present invention is a recording medium recording therein a program for causing a computer that controls an input display control device including a touch panel display to function as:

screen displaying means for displaying an image including a symbol display area in which a symbol input by a user is displayed, on a screen of the touch panel display;

keyboard displaying means for displaying operation buttons and symbols allocated to the operation buttons on the screen of the touch panel display while being superimposed on the image displayed by the screen displaying means, the operation buttons being arrayed in a virtual keyboard through which a symbol to be displayed in the symbol display area is input through tapping on the touch panel display, the operation buttons being translucently displayed; and display color changing means for changing a display color of the symbols allocated to the operation buttons arrayed in the virtual keyboard displayed by the keyboard displaying means to a display color selected from a plurality of display colors set in advance.

Advantageous Effects of Invention

The present invention can prevent a virtual keyboard from offering the user low visibility.

BRIEF DESCRIPTION OF DRAWINGS

FIG. 8 is a block diagram illustrating a configuration example of a thin client system according to a fifth exemplary embodiment of the present invention.

FIG. 9 is a block diagram illustrating an example of a hardware configuration of the input display control device according to the exemplary embodiments of the present invention.

DESCRIPTION OF EMBODIMENTS

Exemplary embodiments of the present invention are described below with reference to the drawings. An input display control application according to the exemplary embodiments of the present invention is referred to as a smart keyboard manager in the description below.

First Exemplary Embodiment

Figure 1A:
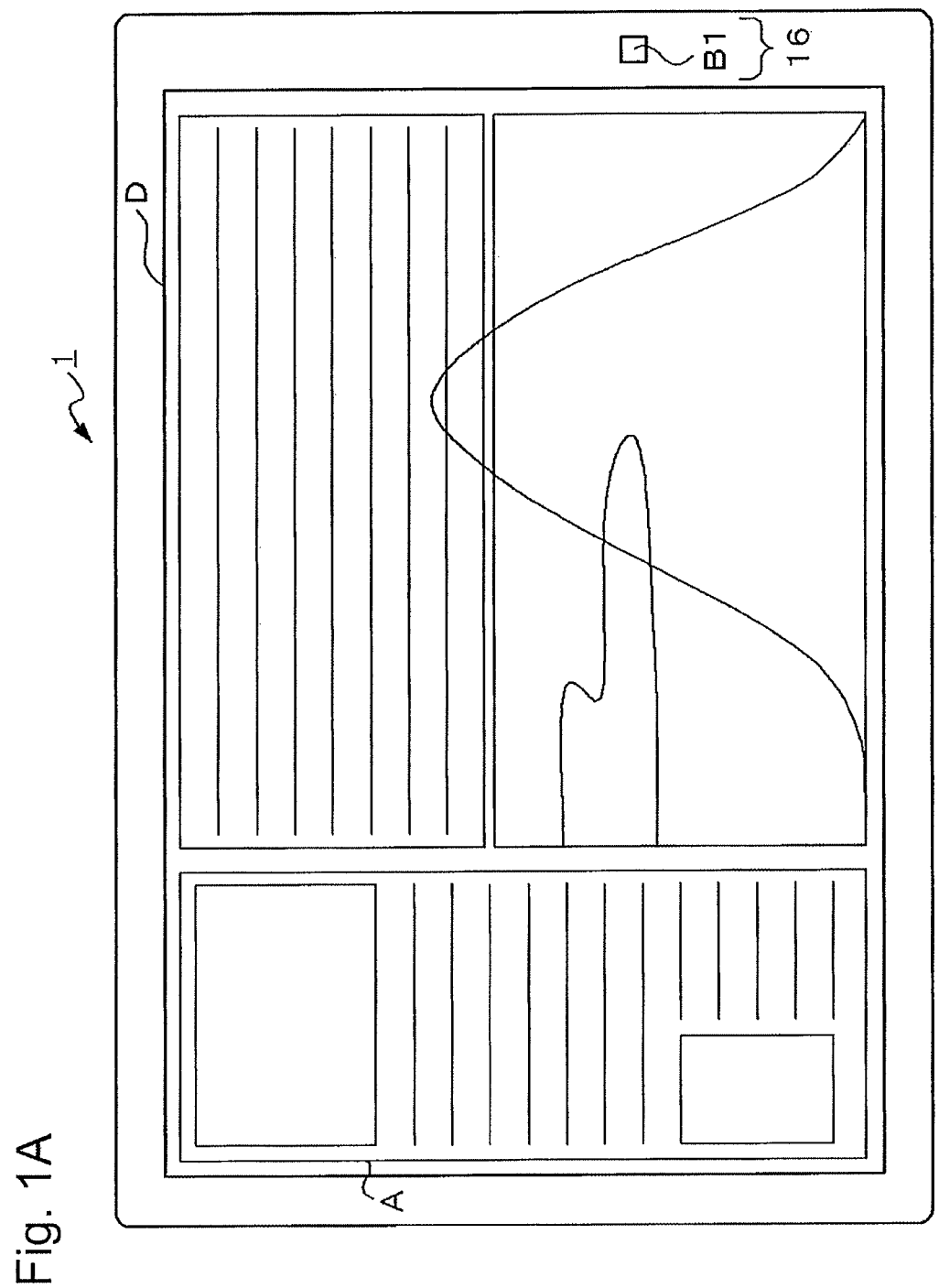
FIG. 1A is a diagram illustrating a screen of a touch panel display controlled by an input display control device according to a first exemplary embodiment of the present invention.

How a smart keyboard manager according to a first exemplary embodiment of the present invention displays a keyboard is described with reference to FIG. 1. As shown in FIG. 1A, an input display control device 1 according to the first exemplary embodiment includes a touch panel display D. An image including a symbol display area A is displayed on a screen of the touch panel display D. For example, symbols input by a user are displayed in the symbol display area A. The symbols include alphabet characters, hiragana characters, numbers, symbols, unit displays, and function displays. The image include various characters, numbers, photographs, and drawings.

Figure 1B:
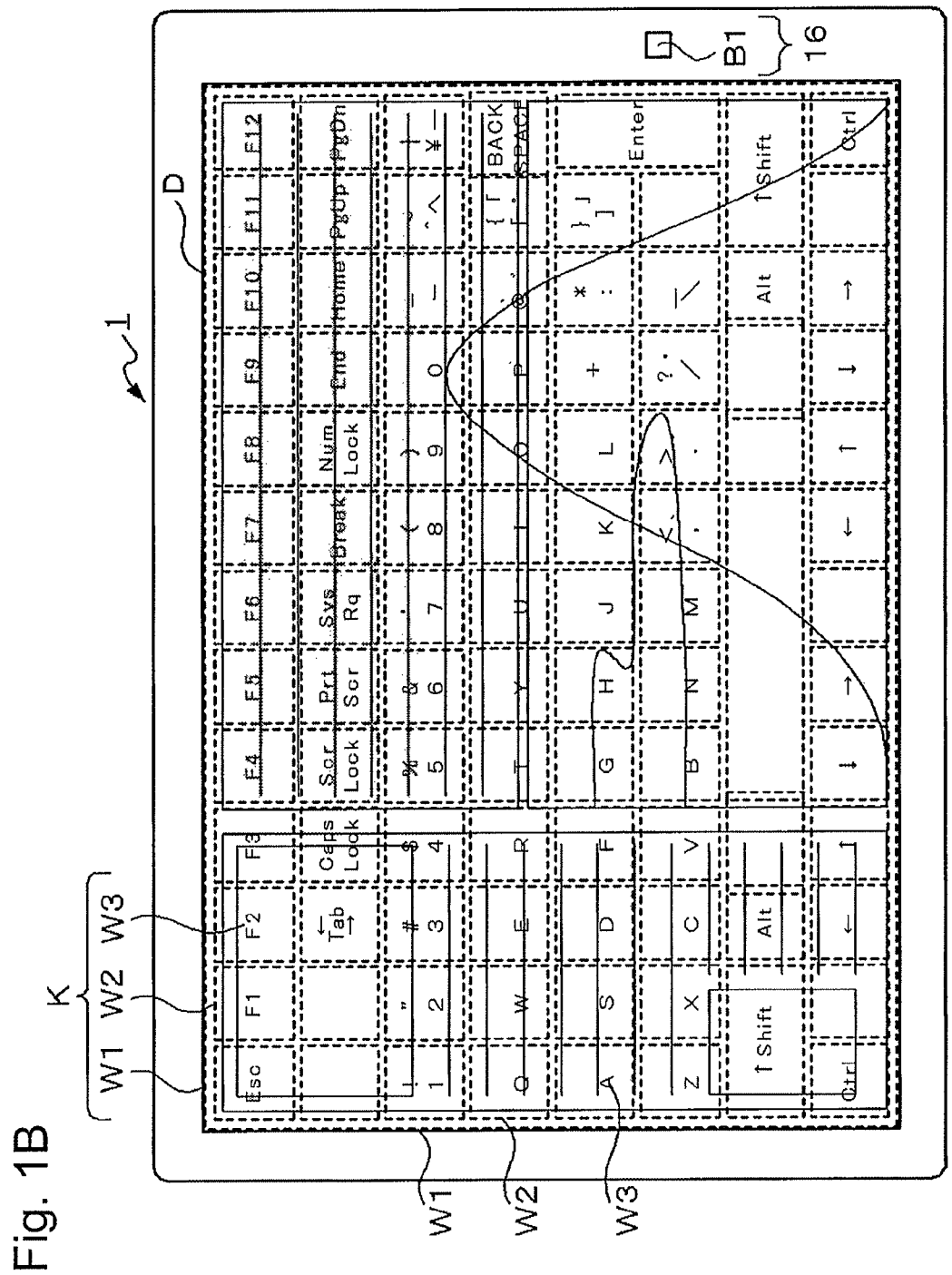
FIG. 1B is a diagram illustrating a virtual keyboard managed by a smart keyboard manager of the input display control device according to the first exemplary embodiment of the present invention.

The smart keyboard manager is started while the input display control device 1 is displaying an image on the screen of the touch panel display D. Here, the input display control device 1 displays a virtual keyboard K managed by the smart keyboard manager, on the screen of the touch panel display D, to be superimposed on the displayed image, as shown in FIG. 1B.

The virtual keyboard K is used by the user to input symbols, to be displayed in the symbol display area A, by tapping (touching) the touch panel display. The virtual keyboard K includes a keyboard frame W1, a plurality of arrayed operation buttons W2, symbols (including alphabet characters, hiragana characters, numbers, symbols, unit displays, and function displays) W3 allocated to the operation buttons W2. Here, "tapping" is an act of the user to touch the screen of the touch panel display D with a specific condition satisfied, and will be described in detail later.

The keyboard frame W1 and the operation buttons W2 are translucently displayed. The term "translucently displayed" means that the keyboard frame W1 and the operation buttons W2 are displayed with pixels calculated in such a manner that the underlying image can be seen through.

The symbols W3 are not translucently displayed but are non-translucently (opaquely) displayed. Thus, the user cannot see the underlying image in an area where the symbols W3 are displayed.

Figure 2A:
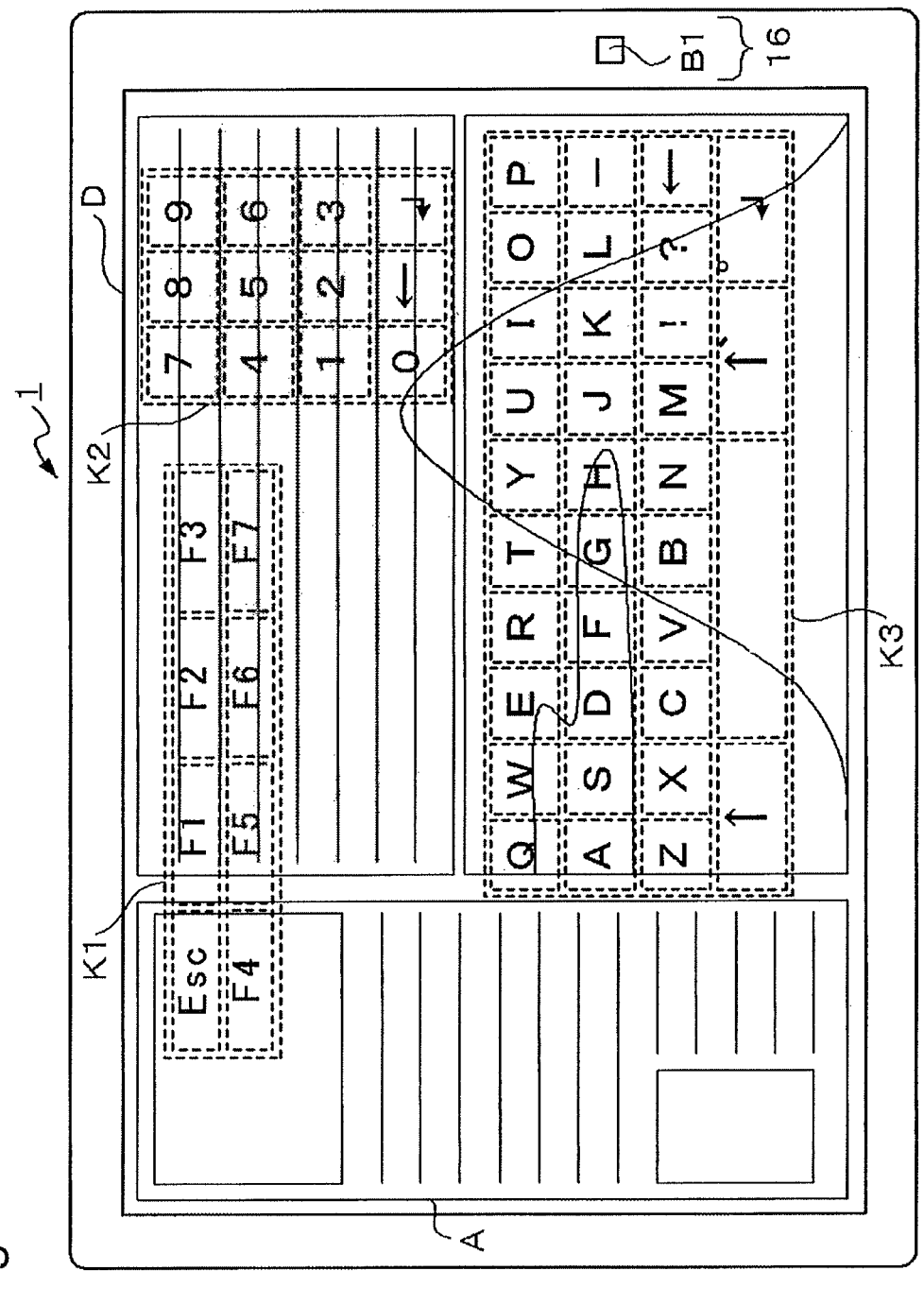
FIG. 2A is a diagram illustrating floating display of the virtual keyboard of the smart keyboard manager of the input display control device according to the first exemplary embodiment of the present invention.

The smart keyboard manager may display a plurality of virtual keyboards K1, K2, and K3 to be superimposed on the image displayed on the screen of the touch panel display D as shown in FIG. 2A. Here, the smart keyboard manager may display the virtual keyboards K1, K2, and K3 in such a manner as to be freely placed on the screen of the touch panel display D by the user (floating display). The smart keyboard manager may display a combination between the virtual keyboards K1 and K3 or the virtual keyboard K2 and K3 for example, to be superimposed on the image displayed on the screen of the touch panel display D in accordance with the selection made by the user.

Figure 2B:
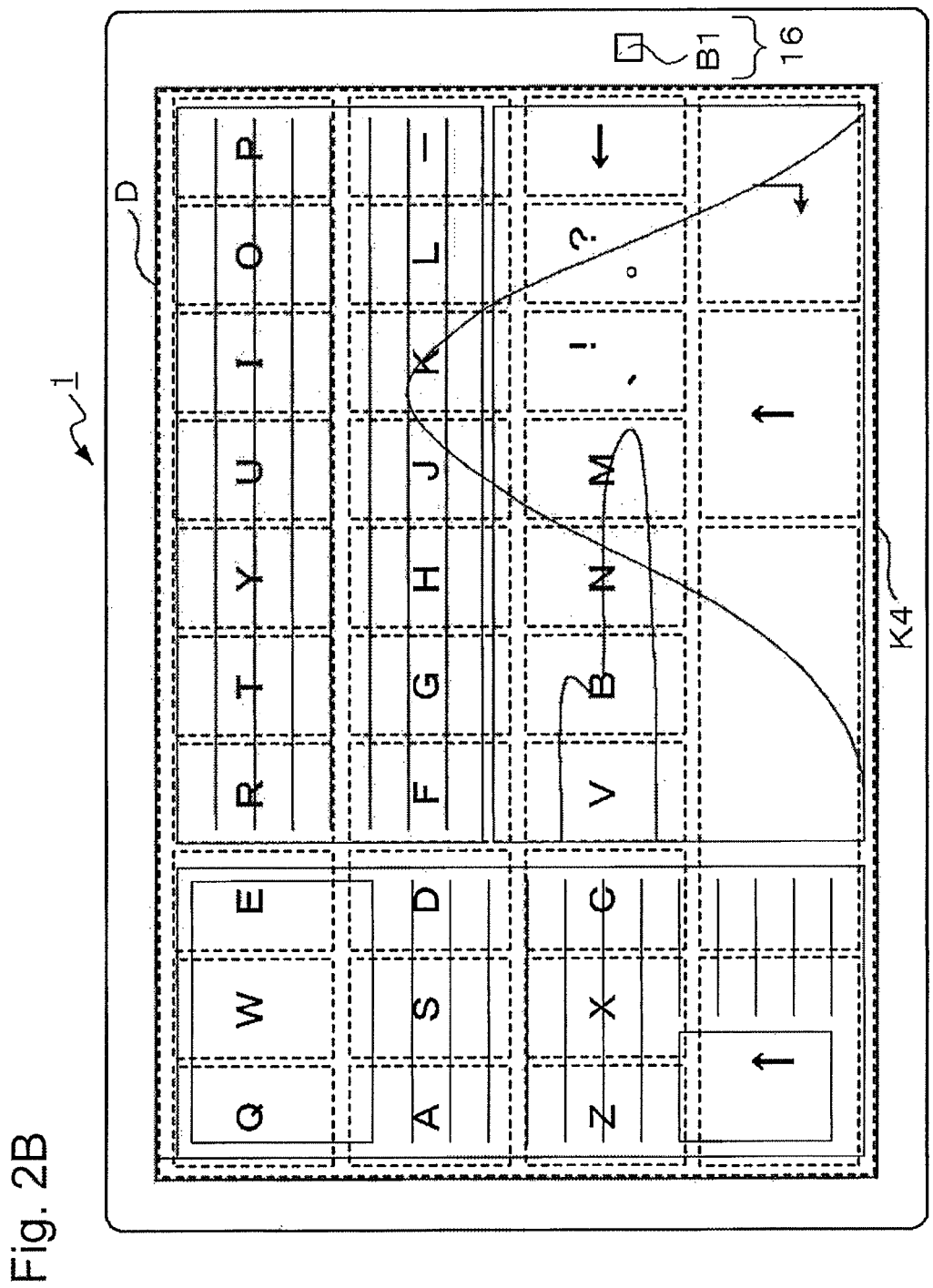
FIG. 2B is a diagram illustrating full-screen display of the virtual keyboard of the smart keyboard manager of the input display control device according to the first exemplary embodiment of the present invention.

Furthermore, the smart keyboard manager may display a virtual keyboard K4, related to input of alphabet characters, to be superimposed on the image displayed on the screen of the touch panel display D, as shown in FIG. 2B. For example, it is assumed that the user has pressed a hardware button unit 16. In response to this operation, the smart keyboard manager may switch the virtual keyboard K4, related to input of alphabet characters, to a virtual keyboard, related to an input of katakana characters, to be displayed on the screen of the touch panel display D.

It is assumed that the user has tapped (touched) a symbol W3 (symbol W3 allocated to each operation button W2) displayed on the screen of the touch panel display D by the input display control device 1. Here, the input display control device 1 executes processing related to the tapped symbol W3 (for example, displaying of an alphabet character on the screen of the touch panel display D or deleting of the number that has been displayed).

When a hardware button B1 is pressed by the user, the input display control device 1 changes a display color of the symbols W3 of the virtual keyboards K and K1 to K4 displayed on the screen of the touch panel display D.

Figure 2C:
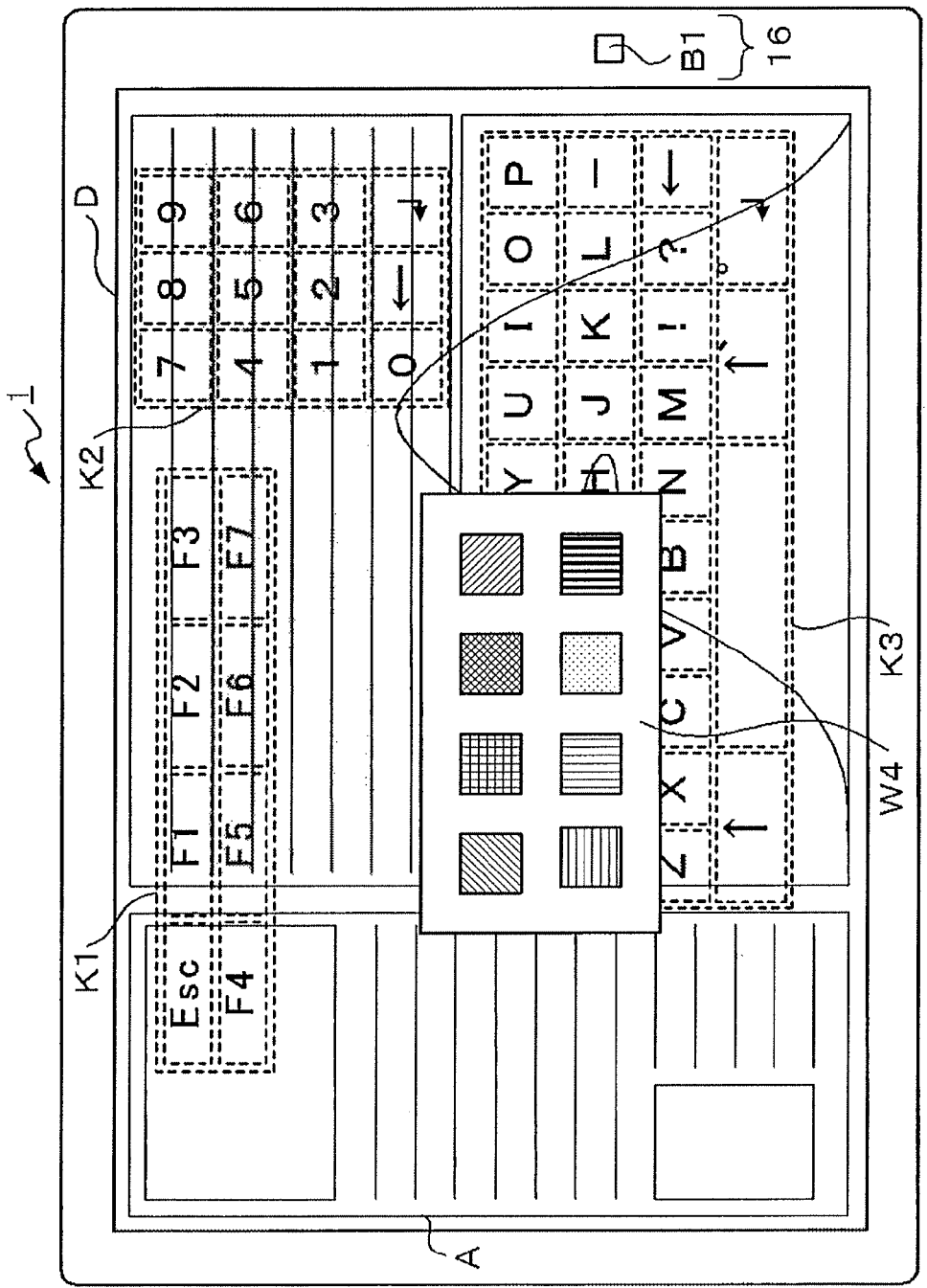
FIG. 2C is a diagram illustrating a screen on which a display color candidate window is displayed in the input display control device according to the first exemplary embodiment of the present invention.

Specifically, it is assumed that the hardware button B1 is pressed by the user as illustrated in FIG. 2C. In response to this operation, the input display control device 1 displays a display color candidate window W4, for presenting a plurality of display color candidates, on the screen of the touch panel display D to allow the user to select the display color. When the hardware button B1 is pressed again by the user to input information indicating that the display color has been selected, the input display control device 1 changes the display color of the symbols W3 of the virtual keyboards K and K1 to K4 to the selected display color.

The input display control device 1 can change the display color of the symbols W3 of the virtual keyboards K and K1 to K4 to the display color selected from the display color candidates (the display color of the keyboard frame W1 and the operation buttons W2 is fixed). Thus, the user can achieve the display of the symbols W3 with a display color offering high visibility on the screen of the touch panel display D, in accordance with the image onto which the virtual keyboards K and K1 to K4 are superimpose to be displayed. Accordingly, the user can prevent the virtual keyboards K and K1 to K4 from having low visibility. The input display control device 1 translucently displays the keyboard frame W1 and the operation buttons W2, whereby the user can see the underlying image through the virtual keyboards K and K1 to K4. Thus, the virtual keyboards K and K1 to K4 are less likely to hinder the user operation. The symbols W3 are not translucently displayed but are non-translucently (opaquely) displayed by the input display control device 1, and thus offer the user high visibility when displayed on the screen of the touch panel display D.

Next, the configuration of the input display control device 1 according to the first exemplary embodiment will be described with reference to FIG. 3. The input display control device 1 includes a display unit 11, an input unit 12, an operation recognition unit 13, a storage unit 14, a display control unit 15, and the hardware button unit 16.

The display unit 11 includes a liquid crystal panel and the like, and displays an image generated by the display control unit 15. The input unit 12 includes a position input device such as a touch pad provided on a surface of the liquid crystal panel included in the display unit 11 for detecting the tapping and receives an input from the user through the tapping. The display unit 11 and the input unit 12 are implemented by the touch panel display D.

The operation recognition unit 13 acquires a position, on the touch panel display D, where the input unit 12 has detected the tapping. The operation recognition unit 13 matches the position against screen coordinate information, indicating coordinates on the screen, stored in the storage unit 14 to recognize contact coordinates. The operation recognition unit 13 recognizes a tapping duration from the start to the end of the tapping detected by the input unit 12. The operation recognition unit 13 transmits the contact coordinates and the tapping duration to the display control unit 15.

The display control unit 15 reads image information, for generating an image to be displayed on the screen of the display unit 11, from the storage unit 14, generates the image to be displayed on the screen of the display unit 11, and displays the generated image on the screen of the display unit 11.

When the smart keyboard manager is started, the display control unit 15 reads data on the virtual keyboard K of the smart keyboard manager from the storage unit 14, and displays the virtual keyboard K at a specific position in the screen of the display unit 11.

The display control unit 15 determines whether the user has tapped any of the operation buttons W2 (see FIGS. 1 and 2) based on the contact coordinates and the tapping duration received from the operation recognition unit 13.

In the present exemplary embodiment, the display control unit 15 determines that the tapping has been performed when a display area of the operation button W2 includes the contact coordinates at the tapping start point, and the tapping duration is equal to or longer than a threshold α and is equal to or shorter than a threshold β. With the threshold α, the display control unit 15 can be prevented from determining touching involving a short tapping duration, such as unintentional touching by the user, as the tapping. With the threshold β, the user who has touched a wrong operation button W2 can cancel the operation by keeping on tapping the touched operation button.

The display control unit 15 may be configured to enable the user to cancel the operation by moving the touched position, with a threshold provided not only to the tapping duration, but also to a displacement from the contact coordinates at the tapping start point. The display control unit 15 may be configured to determine any tapping involving the contact coordinates at the tapping start point within the display area of the operation button W2 and tapping duration not less than 0.

Upon determining that the user has tapped the operation button W2, the display control unit 15 generates event information, issued in response to the selected operation button W2, from data stored in the storage unit 14, and thus issues an event.

The display control unit 15 refers to processing information, indicating association between event and processing, stored in the storage unit 14, and executes processing associated with the issued event.

For example, when the event issued in response to the selected operation button W2 is hiragana character あ(A), the display control unit 15 displays the hiragana character あ(A), on the screen of the display unit 11. When the event issued in response to the selected operation button W2 is "BACK SPACE", the display control unit 15 deletes one character and the like before the cursor displayed on the screen of the display unit 11. A function unit of the input display control device 1, other than the display control unit 15, may refer to the processing information and execute processing associated with an issued event.

The hardware button unit 16 includes a hardware button B1 and a signal output device. The hardware button unit 16 causes the signal output device to output an electrical signal when the hardware button B1 is pressed. Upon receiving the output electrical signal, the display control unit 15 reads out display color information, indicating a plurality of display colors, from the storage unit 14, and displays the display color candidate window W4 on the screen of the display unit 11 to allow the user to select the display color. Then, when the hardware button B1 is pressed to input information indicating that the display color is selected, the display control unit 15 changes the display color of the symbols W3 of the keyboards K and K1 to K4 to the selected display color.

Figure 4:
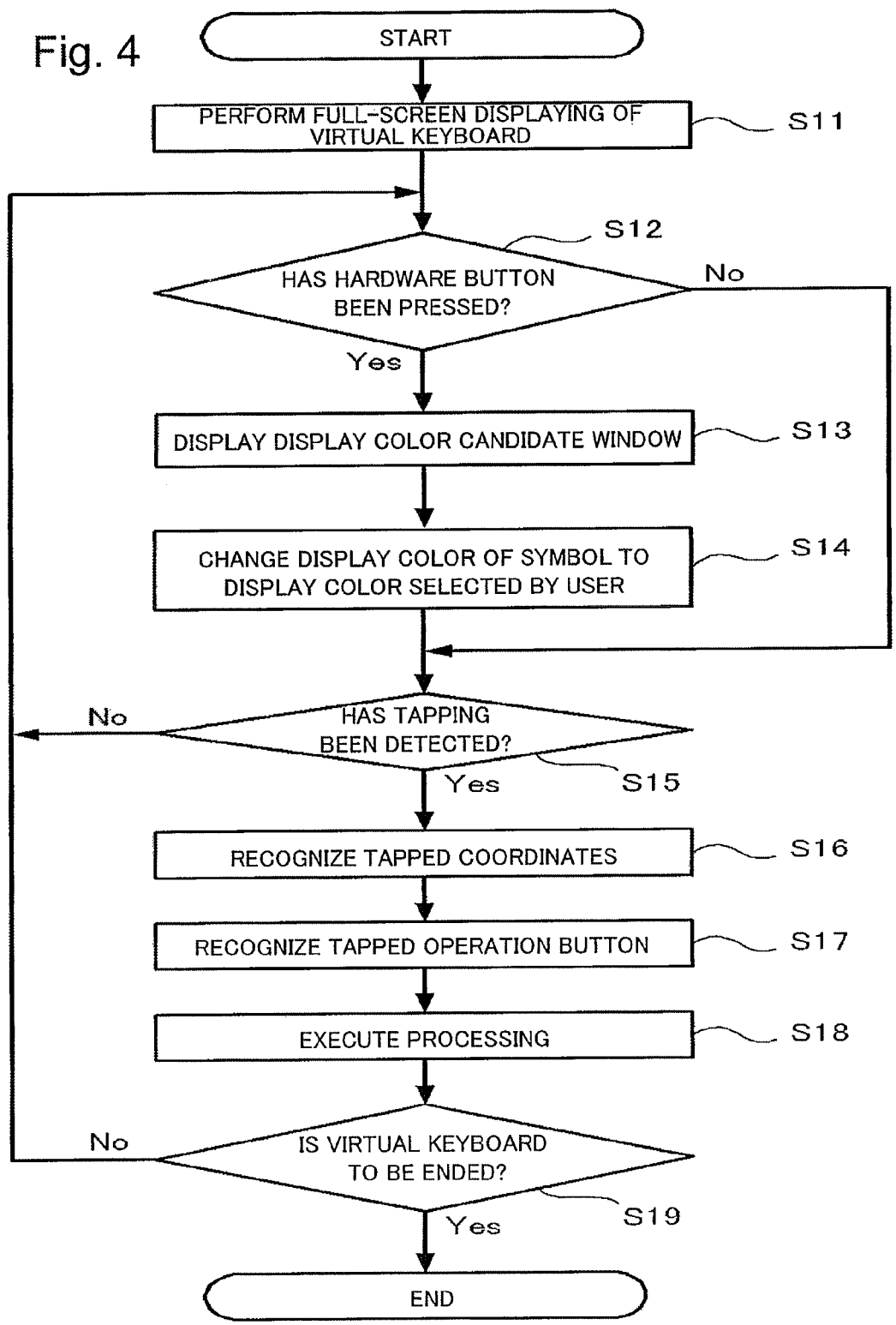
FIG. 4 is a flowchart illustrating an example of operations of the input display control device according to the first exemplary embodiment of the present invention.

Next, operations of the input display control device 1 according to the first exemplary embodiment will be described with reference to FIG. 4. For example, the processing illustrated in the flowchart in FIG. 4 starts when an instruction for starting the smart keyboard manager and full-screen display for the virtual keyboard K or K4 (see FIGS. 1B and 2B) is received through the input unit 12 (when a user operation is performed).

The display control unit 15 reads out, from the storage unit 14, data on the keyboard K (or data on the virtual keyboard K4) of the smart keyboard manager. The display control unit 15 performs full-screen displaying of the virtual keyboard K (or the virtual keyboard K4) to be superimposed on the image displayed on the screen of the display unit 11 (step S11).

Then, the display control unit 15 determines whether the hardware button B1 has been pressed (step S12). Upon determining that the hardware button B1 has been pressed (step S12: Yes), that is, upon receiving the electrical signal output from the hardware button unit 16, the display control unit 15 reads out the display color information, indicating a plurality of display colors, from the storage unit 14. Then, the display control unit 15 displays the display color candidate window W4 on the screen of the touch panel display D to allow the user to select the display color (step S13).

Then, when the hardware button B1 is pressed to input the information indicating that the display color is selected, the display control unit 15 changes the display color of the symbols W3 of the virtual keyboard K (or the virtual keyboard K4) to the selected display color (step S14). Then, the operation recognition unit 13 executes step S15.

Upon determining that the hardware button B1 has not been pressed (step S12: No), that is, when the electrical signal has not been received, the display control unit 15 skips steps S13 and S14.

Subsequently, the operation recognition unit 13 determines whether the touch panel display D has been tapped (step S15). When the operation recognition unit 13 determines that the touch panel display D has not been tapped (step S15: No), that is, when the input unit 12 has not detected the tapping on the touch panel display D, the processing returns to step S12.

Upon determining that the touch panel display D has been tapped (step S15: Yes), that is, when the input unit 12 has detected the tapping on the touch panel display D, the operation recognition unit 13 acquires a position on the touch panel display D where the input unit 12 has detected the tapping. Then, the operation recognition unit 13 matches the acquired position against the screen coordinate information stored in the storage unit 14 to recognize the contact coordinates and the tapping duration (step S16). The operation recognition unit 13 transmits the contact coordinates and the tapping duration to the display control unit 15 (step S16).

Then, the display control unit 15 executes the subsequent processing in step S17. Specifically, the display control unit 15 recognizes which operation button W2 has been tapped, based on the contact coordinates and the tapping duration received from the operation recognition unit 13. The display control unit 15 generates the event information, issued in response to the selected operation button W2, from data stored in the storage unit 14, to issue the event.

Then, the display control unit 15 refers to the processing information, indicating association between event and processing, stored in the storage unit 14, and executes the processing associated with the issued event (step S18).

The display control unit 15 determines whether an instruction to end the smart keyboard manager has been issued (step S19). It is assumed that the display control unit 15 has determined that the operation button W2 has not been tapped, and a button to end the smart keyboard manager has been tapped, based on the contact coordinates and the tapping duration received from the operation recognition unit 13 in step S16 (step S19: Yes). In this case, the display control unit 15 ends the smart keyboard manager to thereby end the processing illustrated in FIG. 4.

When the display control unit 15 determines that the button for ending the smart keyboard manager has not been tapped (step S19: No), the processing returns to step S12.

The input display control device 1 according to the first exemplary embodiment can change the display color of the symbols W3 of the virtual keyboard K or K4 to the display color selected from the display color candidates in the display color candidate window W4. Thus, the user can achieve the display of the symbols W3 with a display color offering high visibility on the screen of the touch panel display D, in accordance with the image displayed with the virtual keyboard K or K4 superimposed. Thus, the user can prevent the virtual keyboard K or K4 from having low visibility. The input display control device 1 translucently displays the keyboard frame W1 and the operation buttons W2. Thus, the user can see the underlying image through the virtual keyboards K and K1 to K4. Thus, the virtual keyboards K and K1 to K4 are less likely to hinder the user operation. The symbols W3 are not translucently displayed but are non-translucently (opaquely) displayed by the input display control device 1, and thus offer the user high visibility when displayed on the screen of the touch panel display D.

Second Exemplary Embodiment

An input display control device 1 according to a second exemplary embodiment has a configuration similar to that of the input display control device 1 according to the first exemplary embodiment. In the second exemplary embodiment, the user can drag and thus freely move the virtual keyboards K1 to K3 (see FIG. 2A) of the smart keyboard manager.

Operations of the input display control device 1 according to the second exemplary embodiment are described with reference to FIG. 5. The processing illustrated in FIG. 5 starts when the start instruction for the smart keyboard manager and floating display of the virtual keyboards K1 to K3 (see FIG. 2A) are received through the input unit 12, for example (when a user operation is performed). In the processing illustrated in FIG. 5, the processing related to the counterpart in the flowchart in FIG. 4 is denoted with the same reference numerals.

Figure 5:
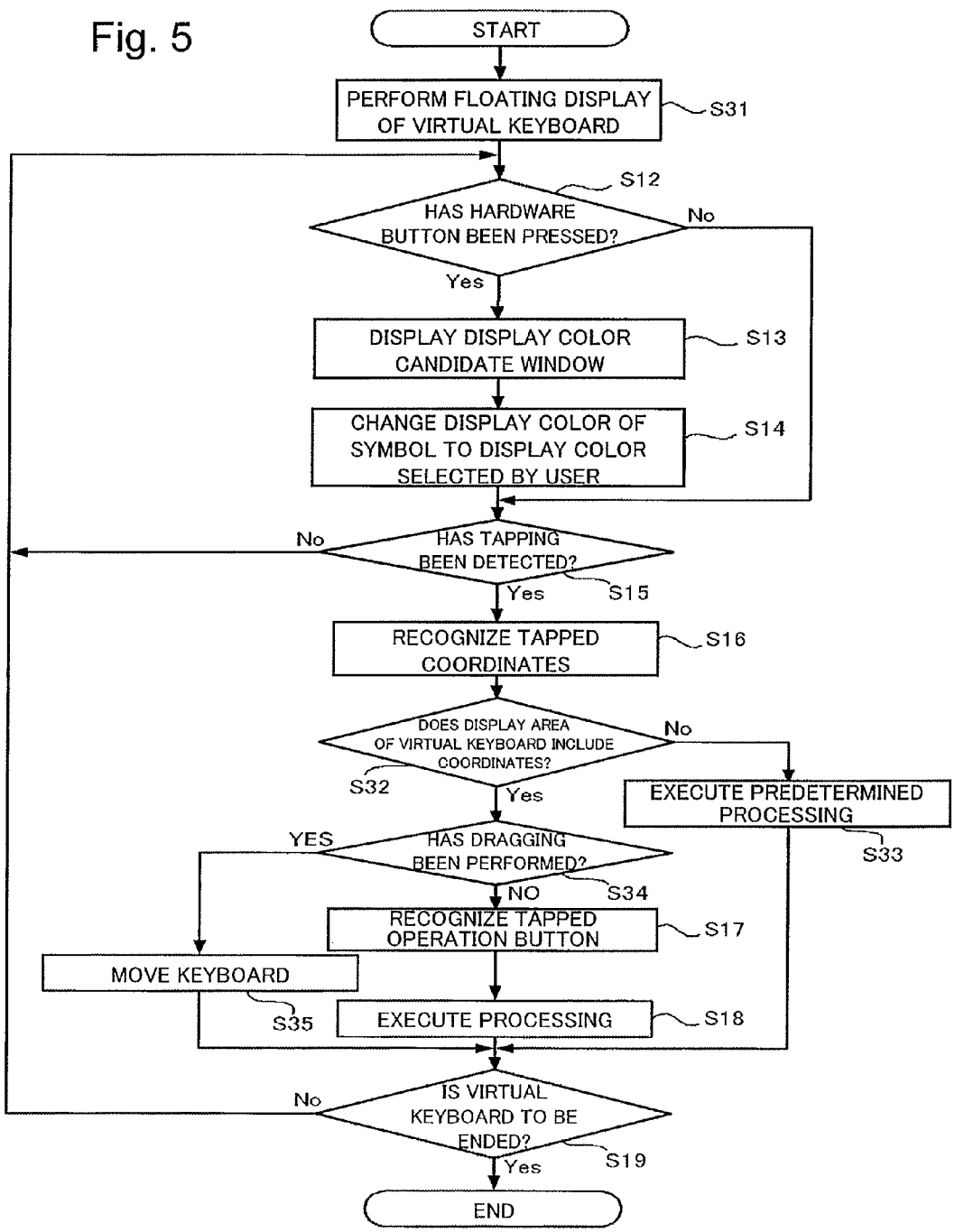
FIG. 5 is a flowchart illustrating an example of operations performed by an input display control device according to a second exemplary embodiment of the present invention.

When the processing illustrated in the flowchart in FIG. 5 starts, the display control unit 15 reads out, from the storage unit 14, data on the keyboards K1 to K3 of the smart keyboard manager. Thus, the display control unit 15 displays the virtual keyboards K1 to K3 at specific positions while being superimposed on the screen displayed on the screen of the display unit 11 (step S31). Specifically, the display control unit 15 displays the virtual keyboards K1 to K3 on part of the screen of the touch panel display D.

Then, the display control unit 15 executes the processing in step S12 to step S14, in accordance with whether the hardware button B1 has been pressed.

Upon determining that the hardware button B1 has been pressed (step S12: Yes), the display control unit 15 reads out the display color information indicating a plurality of display colors from the storage unit 14. Then, the display control unit 15 displays the display color candidate window W4 on the screen of the touch panel display D to allow the user to select the display color (step S13).

Then, when the hardware button B1 is pressed to input the information indicating that the display color is selected, the display control unit 15 changes the display color of the symbols W3 of the virtual keyboards K1 to K3 to the selected display color (step S14). The display color of the keyboard frame W1 and the operation buttons W2 is fixed (for example, red).

Then, the operation recognition unit 13 determines whether the touch panel display D has been tapped (step S15). When the operation recognition unit 13 determines that the touch panel display D has not been tapped (step S15: No), the processing returns to step S12. Upon determining that the touch panel display D has been tapped (step S15: Yes), the operation recognition unit 13 executes the processing in step S16.

After step S16 is executed, the display control unit 15 determines whether areas (display areas) in which the virtual keyboards K1 to K3 are displayed include the contact coordinates received from the operation recognition unit 13 in step S16 (step S32). Upon determining that none of the display areas of the virtual keyboards K1 to K3 includes the contact coordinates (step S32: No), the display control unit 15 matches the contact coordinates against information stored in the storage unit 14, and executes specific processing related to an area including the contact coordinates (step S33). Then, the processing proceeds to step S19.

Upon determining that the any one of the display areas of the virtual keyboards K1 to K3 includes the contact coordinates (S32; Yes), the display control unit 15 determines whether any one of the virtual keyboards K1 to K3 has been dragged, from the tapping duration received from the operation recognition unit 13 in step S16 (step S34). Upon determining that the dragging has been performed (step S34: Yes), for example, the display control unit 15 moves the virtual keyboard K1 to the position of the changed tap coordinates (step S35, when the display area of the virtual keyboard K1 includes the contact coordinates). Then, the processing proceeds to step S19. The display control unit 15 determines that the dragging has been performed when the contact coordinates at the tapping start point are within the display area of any one of the virtual keyboards K1 to K3, and the displacement from the contact coordinates at the tapping start point exceeds a threshold γ.

Upon determining that the dragging has not been performed (step S34: No), the display control unit 15 recognizes which operation button W2 has been tapped based on the contact coordinates and the tapping duration received from the operation recognition unit 13 in step S16 (step S17). Then, the display control unit 15 executes the processing related to the recognized operation button W2 (step S18). Then, the processing proceeds to step S19.

The display control unit 15 determines whether an instruction to end the smart keyboard manager has been issued in step S19.

With the input display control device 1 according to the second exemplary embodiment described above, the user can place each of the keyboards K1 to K3, including the symbol W3 with a variable display color, at a desired position. Thus, the user can dispose the virtual keyboards K1 to K3 at positions offering high visibility.

The input display control device 1 according to the second exemplary embodiment can change the display color of the symbols W3 of the virtual keyboards K1 to K3 to the display color selected from the display colors, as in the case of the input display control device 1 according to the first exemplary embodiment. Thus, the user can achieve the display of the symbols W3 with a display color offering high visibility on the screen of the touch panel display D, in accordance with the image displayed with the virtual keyboards K1 to K3 superimposed. Thus, the user can prevent the virtual keyboards K1 to K3 from having low visibility. The input display control device 1 translucently displays the keyboard frame W1 and the operation buttons W2. Thus, the user can see the underlying image through the virtual keyboards K and K1 to K4. Thus, the virtual keyboards K and K1 to K4 are less likely to hinder the user operation. The symbols W3 are not translucently displayed but are non-translucently (opaquely) displayed by the input display control device 1, and thus offer the user high visibility when displayed on the screen of the touch panel display D.

Third Exemplary Embodiment

An input display control device 1 according to a third exemplary embodiment has a configuration similar to that of the input display control device 1 according to the first exemplary embodiment. In the third exemplary embodiment, the input display control device 1 changes the display color of the symbols W3 in the virtual keyboards K and K4 managed by the smart keyboard manager in accordance with the display color of the image displayed on the display unit 11.

In the third exemplary embodiment, the display control unit 15 acquires the image information for generating the image to be displayed on the screen of the display unit 11, from the storage unit 14. The display control unit 15 calculates the percentage of each of the display colors used in the currently displayed screen based on the image information acquired. The display control unit 15 recognizes five display colors with the highest percentages thus calculated, and changes the display color of the symbols W3 in the virtual keyboards K and K4 to the display color other than the five display colors thus recognized. The display color of the keyboard frame W1 and the operation buttons W2 is fixed (for example, red).

Figure 6:
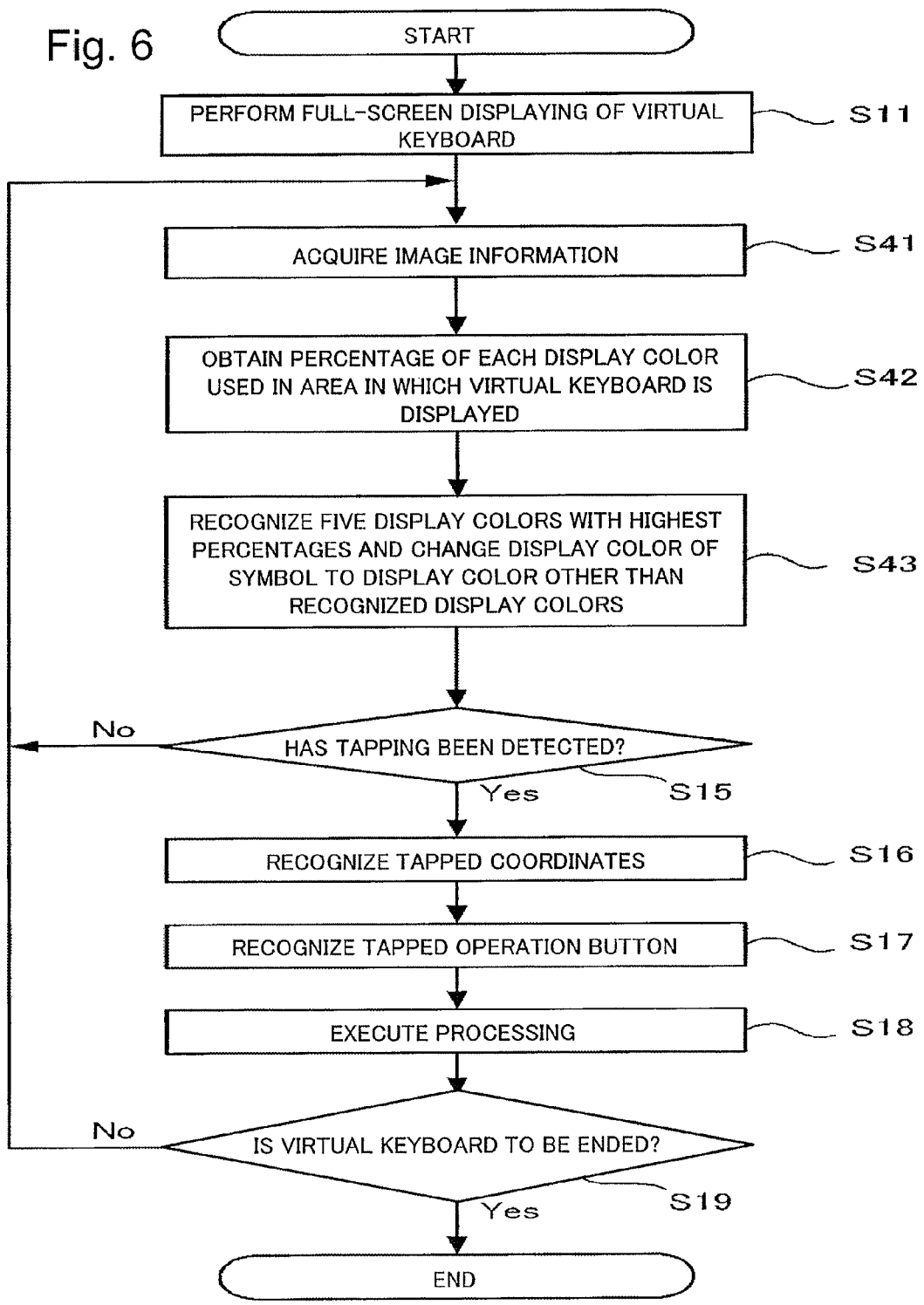
FIG. 6 is a flowchart illustrating an example of operations performed by an input display control device according to a third exemplary embodiment of the present invention.

FIG. 6 is a flowchart illustrating operations of the input display control device 1 according to the third exemplary embodiment. The processing illustrated in FIG. 6 starts when the start instruction for the smart keyboard manager and full-screen display of the virtual keyboard K or K4 (see FIG. 1B and FIG. 2B) are received through the input unit 12, for example (when a user operation is performed). In the processing illustrated in FIG. 6, the processing related to the counterpart in the flowchart in FIG. 4 is denoted with the same reference numerals.

When the processing illustrated in FIG. 6 starts, the display control unit 15 reads out, from the storage unit 14, data on the virtual keyboard K (or data on the virtual keyboard K4) of the smart keyboard manager. The display control unit 15 displays the virtual keyboard K (or the virtual keyboard K4) on the full screen to be superimposed on the image displayed on the screen of the display unit 11 (step S11).

Then, the display control unit 15 acquires the image information for generating the image to be displayed on the screen of the display unit 11 from the storage unit 14 (step S41). The display control unit 15 calculates the percentage of each of the display colors used in the currently displayed screen based on the image information acquired (step S42).

The display control unit 15 recognizes the five used display colors with the highest percentages, and changes the display color of the symbols W3 of the keyboard K (or the virtual keyboard K4) to one display color other than the five display colors thus recognized (step S43). For example, when the display color of the virtual keyboard K or K4 is changeable among eight types, the display control unit 15 changes the display color of the symbols W3 of the virtual keyboard K (or the virtual keyboard K4) to one display color other than the five recognized display colors, that is, one of the three remaining types of display colors.

Then, when the operation recognition unit 13 has determined that the touch panel display D has not been tapped (step S15: No), the processing returns to step S41.

When the input unit 12 detects the tapping on the touch panel display D (step S15: Yes), the operation recognition unit 13 executes step S16. Then, the display control unit 15 executes the processing in step S17 to step S19.

The display control unit 15 determines whether an instruction to end the smart keyboard manager has been issued in step S19.

The input display control device 1 according to the third exemplary embodiment described above changes the display color of the symbols W3 of the virtual keyboard K or K4 of the smart keyboard manager in accordance with the display color of the image displayed on the display unit 11. Thus, the user can achieve the display of the symbols W3 of the virtual keyboard K or K4 displayed on the screen of the touch panel display D, with high visibility. Thus, the user can prevent the virtual keyboards K and K4 from having low visibility. The input display control device 1 translucently displays the keyboard frame W1 and the operation buttons W2. Thus, the user can see the underlying image through the virtual keyboard K or K4. Thus, the virtual keyboards K and K4 are less likely to hinder the user operation. The symbols W3 are not translucently displayed but are non-translucently (opaquely) displayed by the input display control device 1, and thus offer the user high visibility when displayed on the screen of the touch panel display D.

Fourth Exemplary Embodiment

An input display control device 1 according to a fourth exemplary embodiment has a configuration similar to that of the input display control device 1 according to the second exemplary embodiment. In the fourth exemplary embodiment, the display color of the symbols W3 of the virtual keyboards K1 to K3 of the smart keyboard manager is changed in accordance with the display color of the image in areas (display areas) in which the virtual keyboards K1 to K3 are displayed. The display color of the keyboard frame W1 and the operation buttons W2 is fixed (for example, red).

In the fourth exemplary embodiment, the display control unit 15 acquires the image information for generating the image to be displayed on the screen of the display unit 11, from the storage unit 14. The display control unit 15 calculates the percentage of each of the display colors used in the areas (display areas) in which the virtual keyboards K1 to K3 are displayed based on the image information acquired. The display control unit 15 recognizes five display colors with the highest percentages used in each area, and changes the display color of the symbols W3 of the virtual keyboards K1 to K3 to the display color other than the five display colors thus recognized for each area.

Figure 7:
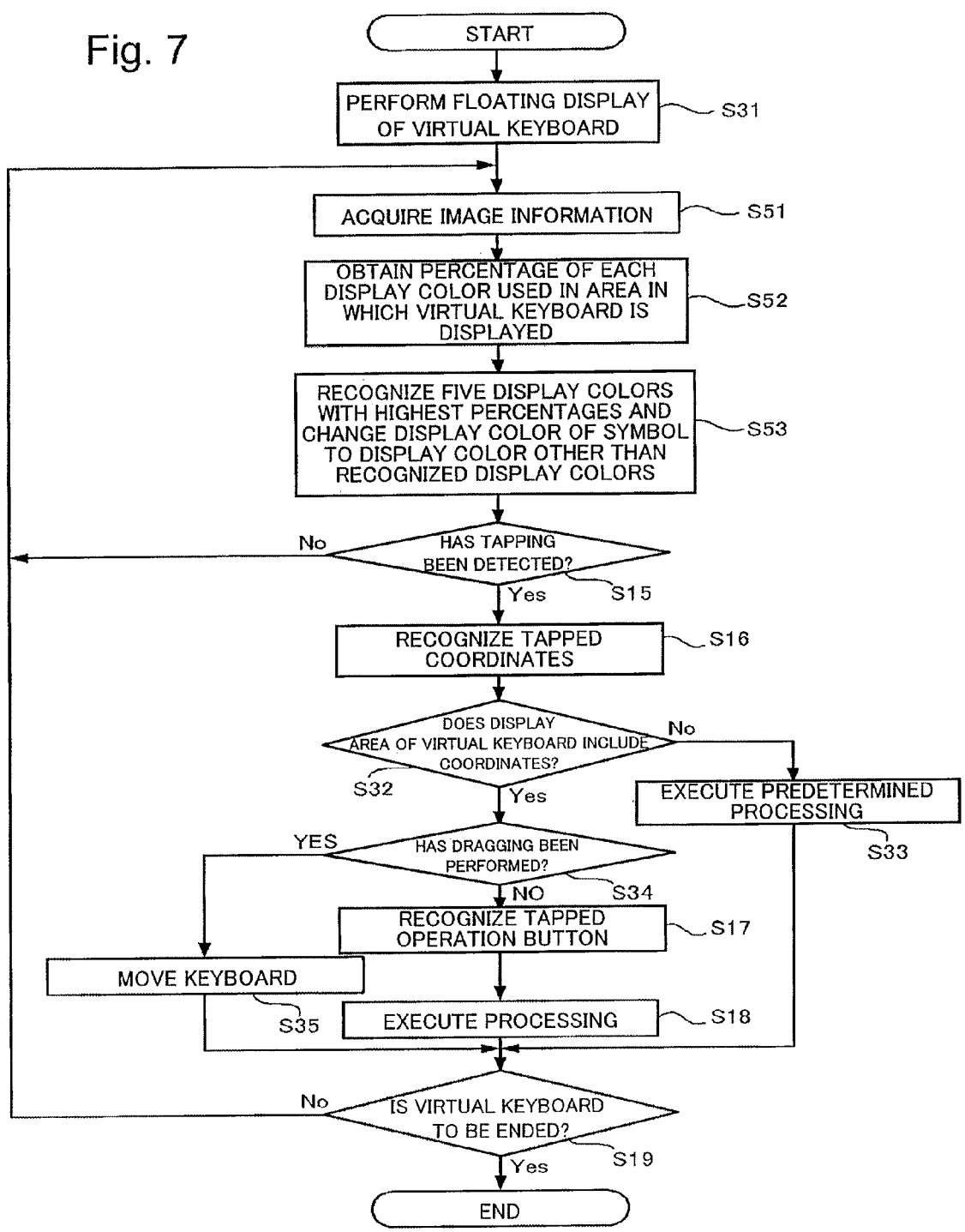
FIG. 7 is a flowchart illustrating an example of operations performed by an input display control device according to a fourth exemplary embodiment of the present invention.

FIG. 7 is a flowchart illustrating an example of operations of the input display control device 1 according to the fourth exemplary embodiment. The processing illustrated in FIG. 7 starts when the instruction for starting the smart keyboard manager and floating screen display of the virtual keyboards K1 to K3 (see FIG. 2A) is received through the input unit 12, for example (when a user operation is performed). In the processing illustrated in FIG. 7, the processing that is the same as the counterpart in the flowchart in FIG. 5 is denoted with the same reference numerals.

When the processing illustrated in FIG. 7 starts, the display control unit 15 reads out, from the storage unit 14, data on the virtual keyboards K1 to K3 of the smart keyboard manager. The display control unit 15 displays the virtual keyboards K1 to K3 to be superimposed on the image displayed on the screen of the display unit 11 (step S31). Thus, the display control unit 15 displays the virtual keyboards K1 to K3 on part of the screen of the touch panel display D.

Then, the display control unit 15 acquires the image information for generating the image to be displayed on the display unit 11 from the storage unit 14 (step S51). The display control unit 15 calculates the percentage of each of the display colors used in each of the areas (display areas) in which the virtual keyboards K1 to K3 are displayed based on the image information acquired (step S52).

The display control unit 15 recognizes the five display colors with the highest percentages in each area, and changes the display color of the symbols W3 of each of the virtual keyboards K1 to K3 to one display color other than the five display colors recognized for the related areas (step S53).

For example, it is assumed that the display color of the virtual keyboards K1 to K3 is changeable among eight types. In this case, the display control unit 15 recognizes five display colors, e.g., blue, red, yellow, green, and black, with the highest percentages used in the area in which the virtual keyboard K1 is displayed. The display control unit 15 changes the display color of the symbols W3 of the virtual keyboard K1 to one display color other than the five recognized display colors, that is, one of the three remaining types of display colors (e.g., white).

The display control unit 15 recognizes five display colors, e.g., blue, white, yellow, green, and black, with the highest percentages used in the area in which the virtual keyboard K2 is displayed. The display control unit 15 changes the display color of the symbols W3 of the virtual keyboard K2 to one display color other than the five recognized display colors, that is, one of the three remaining types of display colors (e.g., purple).

Similarly, the display control unit 15 recognizes five display colors, e.g., red, white, yellow, green, and black, with the highest percentages used in the area in which the virtual keyboard K3 is displayed. The display control unit 15 changes the display color of the symbols W3 of the virtual keyboard K3 to one display color other than the five recognized display colors, that is, one of the three remaining types of display colors (e.g., pink).

When the input unit 12 detects the tapping on the touch panel display D (step S15: Yes), the operation recognition unit 13 executes step S16. Then, the display control unit 15 executes the processing in step S33 to step S35 and step S17 to step S19 in accordance with the determination.

When the input unit 12 has not detected the tapping on the touch panel display D (step S15: No), processing is returned to step S51 by the operation recognition unit 13.

With the input display control device 1 according to the fourth exemplary embodiment described above, the user can place the virtual keyboards K1 to K3 including the symbols W3 with a variable display color at any positions. Thus, the user can place the virtual keyboards K1 to K3 at positions offering high visibility.

The input display control device 1 according to the fourth exemplary embodiment described above changes the display color of the symbols W3 of the virtual keyboards K1 to K3 of the smart keyboard manager in accordance with the display colors of the images in which the virtual keyboards K1 to K3 are displayed. Thus, the user can achieve the display of the symbols W3 with high visibility on the screen of the touch panel display D. Thus, the user can prevent the virtual keyboards K1 to K3 from having low visibility. The input display control device 1 translucently displays the keyboard frame W1 and the operation buttons W2. Thus, the user can see the underlying image through the virtual keyboards K and K1 to K4. Thus, the virtual keyboards K and K1 to K4 are less likely to hinder the user operation. The symbols W3 are not translucently displayed but are non-translucently (opaquely) displayed by the input display control device 1, and thus offer the user high visibility when displayed on the screen of the touch panel display D.

Fifth Exemplary Embodiment

The configuration of a thin client system according to a fifth exemplary embodiment of the present invention is described with reference to FIG. 8. A thin client system 100 includes an input display control device 1 and a server 2 connected to each other through a network. The input display control device 1 includes the display unit 11, the input unit 12, the operation recognition unit 13, the storage unit 14, the display control unit 15, the hardware button unit 16, a screen reception unit 17, and an event transmission unit 18. The server 2 includes an execution unit 21, a storage unit 22, a screen transmission unit 23, and an event reception unit 24.

The display unit 11, the input unit 12, the operation recognition unit 13, the storage unit 14, and the hardware button unit 16 of the input display control device 1 have similar configurations as those in the input display control device 1 according to the first exemplary embodiment.

The screen reception unit 17 receives image information transmitted from the screen transmission unit 23 through the processing performed by the execution unit 21 of the server 2, that is, image information for generating an image to be displayed on the screen of the display unit 11 (screen of the touch panel display D). The display control unit 15 generates an image including the symbol display area A (see FIG. 1A) from the image information received by the screen reception unit 17, and displays the image on the screen of the display unit 11 (screen of the touch panel display D).

The display control unit 15 generates the virtual keyboard K (or the virtual keyboard K4) from data stored in the storage unit 14, and displays the virtual keyboard K (or the virtual keyboard K4) thus generated on the screen of the display unit 11.

In the fifth exemplary embodiment, the display control unit 15 displays the virtual keyboard K (or the virtual keyboard K4) on the full screen to be superimposed on the image displayed on the screen of the display unit 11, with the keyboard frame W1 and the operation buttons W2 translucently displayed and the symbols W3 non-translucently (opaquely) displayed. Upon determining that the hardware button B1 has been pressed, the display control unit 15 reads out display color information, indicating a plurality of display colors, from the storage unit 14, and displays the display color candidate window W4 on the screen of the display unit 11 to allow the user to select the display color.

When the information indicating that the display color is selected is input through the user operation with the hardware button B1, the display control unit 15 changes the display color of the symbols W3 of the virtual keyboard K or K4 to the selected display color. The display color of the keyboard frame W1 and the operation buttons W2 is fixed (for example, red).

The display control unit 15 recognizes which operation button W2 has been tapped, based on the contact coordinates and the tapping duration received from the operation recognition unit 13. The display control unit 15 generates the event information, issued in response to the selected operation button W2, from data stored in the storage unit 14, to issue the event.

The display control unit 15 outputs the event information thus generated to the event transmission unit 18. The other configuration of the display control unit 15 is similar to that in the first exemplary embodiment. The event transmission unit 18 transmits the event information, received from the display control unit 15, to the event reception unit 24 of the server 2.

Upon receiving the event information from the event transmission unit 18 of the input display control device 1, the event reception unit 24 outputs the event information to the execution unit 21. The execution unit 21 refers to processing information, indicating association between event and processing, stored in the storage unit 22, and executes the processing associated with the received event information. The execution unit 21 reads out image information indicating the executed processing screen from the storage unit 22, and transmits the image information to the screen transmission unit 23. Then, the image transmission unit 23 transmits the image information to the screen reception unit 17 of the input display control device 1.

When the screen reception unit 17 of the input display control device 1 receives the image information indicating the processing screen from the screen transmission unit 23 of the server 2, the display control unit 15 generates the processing screen based on the image information received by the screen reception unit 17, and displays the processing screen thus generated on the display unit 11.

The thin client system described above can be formed not only by the input display control device 1 according to the first exemplary embodiment, but can also be formed by the input display control device 1 according to the second to fourth exemplary embodiments.

In the thin client system 100 according to the fifth exemplary embodiment, the server 2 executes the processing, and thus a smaller load is imposed on the input display control device 1. Thus, the cost and the size of the input display control device 1 can be reduced.

In the thin client system 100, when the server 2 includes a display, the screen for the display of the server 2 is displayed on the touch panel display D of the input display control device 1. When the touch panel display D of the input display control device 1 is smaller than the display of the server 2, the screen is downsized to be displayed. Even in this case, the user can see the underlying image through the virtual keyboard K or K4. Thus, the virtual keyboard K or K4 is less likely to hinder the user operation. The user can prevent the virtual keyboard K or K4 from having low visibility.

The hardware configuration of the input display control device 1 according to the exemplary embodiments is described with reference to FIG. 9.

A control unit 31 includes a central processing unit (CPU) and the like, and executes each processing of the operation recognition unit 13 and the display control unit 15 in accordance with a control program 39 stored in an external storage unit 33.

A main storage unit 32 includes a random-access memory (RAM) and the like. The control program 39, stored in the external storage unit 33, is loaded onto the main storage unit 32, and thus the main storage unit 32 is used as a work area for the control unit 31.

The external storage unit 33 includes a non-volatile memory such as a flash memory, a hard disk, a digital versatile disc random-access memory (DVD-RAM), and a digital versatile disc rewritable (DVD-RW). The external storage unit 33 stores the control program 39 for causing the control unit 31 to execute the processing of the input display control device 1. The external storage unit 33 supplies various types of data used for executing the control program 39 to the control unit 31 and stores data supplied from the control unit 31, under an instruction from the control unit 31. The storage unit 14 includes the external storage unit 33.

An operation unit 34 includes an interface device that connects a position input device such as a touchpad and an input device such as a button switch to an internal bus 30. When the user performs an operation input with the operation unit 34, an instruction related to the operation input is supplied from the operation unit 34 to the control unit 31. The operation unit 34 functions as the input unit 12 and the hardware button unit 16.

A display unit 35 includes a cathode ray tube (CRT) or a liquid crystal display (LCD), and the like, and displays an application screen and the like. The display unit 35 functions as the display unit 11.

A timer 36 periodically supplies the current time to the control unit 31 through the internal bus 30. The control unit 31 checks the tapping duration based on the current time supplied from the timer 36.

The input display control device 1 in the thin client system 100 according to the fifth exemplary embodiment further includes a communication unit including a network terminal device or a wireless communication device connected to the network and a serial interface, a local area network (LAN) interface, or the like connected to the device. The communication unit establishes communications with the server 2 through the network. The communication unit functions as the screen reception unit 17 and the event transmission unit 18.

Figure 3:
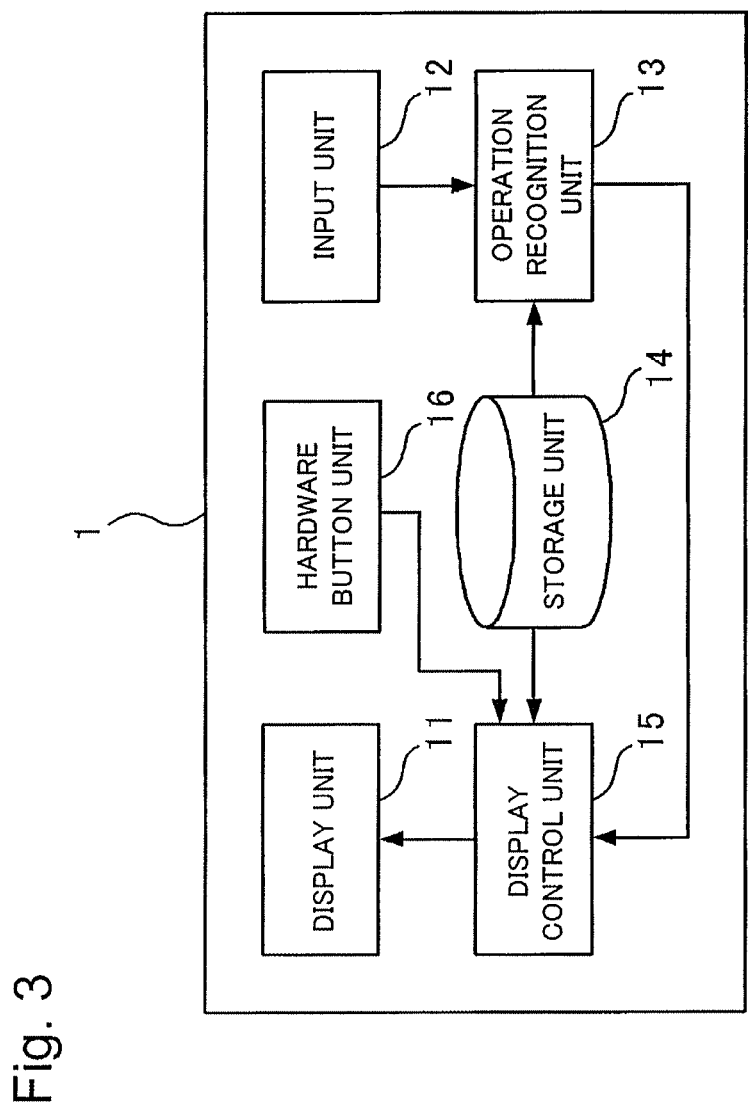
FIG. 3 is a block diagram illustrating a configuration example of the input display control device according to the first exemplary embodiment of the present invention.

The display unit 11, the input unit 12, the operation recognition unit 13, the storage unit 14, the display control unit 15, and the hardware button unit 16 shown in FIG. 3 are implemented by the control program 39 performing the processing by using the control unit 31, the main storage unit 32, the external storage unit 33, the operation unit 34, the display unit 35, and the timer 36 as resources.

The hardware configuration and the flowcharts are merely an example and thus can be changed and modified in any way.

A main portion of the processing in the system including the control unit 31, the main storage unit 32, the external storage unit 33, and the internal bus 30 is not necessarily a dedicated system, but may be implemented with a general computer system. For example, the computer program for executing the operations described in the exemplary embodiments may be stored in a computer-readable recording medium (such as a flexible disk, a CD-ROM, and a DVD-ROM) to be distributed. Thus, the input display control device 1 may be configured to install the computer program in a computer to execute the operations described in the exemplary embodiments. The computer program may be stored in a storage device of a server device on a communication network such as the Internet, and the general computer system may download the computer program or perform other like operation to implement the input display control device 1.

The functions of the input display control device 1 may be distributed to an operating system (OS) and an application program, may be implemented through the cooperation between the OS and the application program, or may be implemented in other like ways. In this case, only the application program portion may be stored in a recording medium or a storage device.

The computer program may be superimposed on carrier waves to be distributed through a communication network. For example, the computer program may be posted on a bulletin board system (BBS) on the communication network to be distributed through the network. Thus, the input display control device 1 may be configured to start and execute the computer program in a manner similar to that for other applications, under the control of the OS, to implement the operations described in the exemplary embodiments.

The exemplary embodiment of the present invention are described above. However, the present invention is not limited to the exemplary embodiment described above and can be modified and applied in various ways.

For example, the input display control device 1 according to the exemplary embodiments non-translucently (opaquely) displays the symbols W3 of the virtual keyboards K and K1 to K4. However, this should not be construed in a limiting sense. The input display control device 1 according to the exemplary embodiments may translucently display the symbols W3.

In the input display control device 1 according to the exemplary embodiments, the user directly taps and thus operates the operation button W2 with his/her fingers. However, this should not be construed in a limiting sense. The input display control device 1 according to the exemplary embodiments may be configured to allow the user to press and thus operate the operation button W2 with a pointer.

The input display control device 1 according to the exemplary embodiments changes the display color of the symbols W3 of the virtual keyboards K and K1 to K4 to the selected display color. However, this should not be construed in a limiting sense. The input display control device 1 according to the exemplary embodiments may change the display color of not only the symbols W3 but also the keyboard frame W1 and the operation buttons W2 to the selected display color.

The input display control device 1 according to the first, second, and fifth exemplary embodiments displays the display color candidate window W4 on the screen of the touch panel display D upon determining that the hardware button B1 has been pressed. When the information indicating that the display color is selected by the re-pressing of the hardware button B1, the input display control device 1 changes the display color of the symbols W3 of the virtual keyboard to the selected display color. However, how the display color is changed is not limited to this. The input display control device 1 according to the first, second, and fifth exemplary embodiments may change the display color upon determining that any one of the operation buttons W2 (for example, the operation button allocated with a display color changing function) has been tapped instead of determining whether the hardware button B1 has been pressed. In this case, the display color may be changed as follows. Specifically, a plurality of display color candidates may be displayed on the screen of the touch panel display D, and when any one of the operation button W2 is tapped to input the information indicating that the display color is selected, the display color of the symbols W3 of the virtual keyboard may be changed to the selected display color.

The input display control device 1 according to the second and fourth exemplary embodiments determines that the dragging has been performed when the displacement from the contact coordinates at the tapping start point exceeds the threshold γ, and determines that the tapping has been performed when the displacement does not exceed the threshold γ, under the condition that the display area of any one of the virtual keyboards K1 to K3 includes the contact coordinates at the tapping start point. However, how the determination is made is not limited to this. Different thresholds may be used to determine the tapping and the dragging.

The input display control device 1 according to the third and fourth exemplary embodiments recognizes five display colors with the highest percentages and changes the display color of the symbols W3 of the virtual keyboards K and K1 to K4 to one display color other than the five display colors thus recognized. However, this should not be construed in a limiting sense. The input display control device 1 according to the third and fourth exemplary embodiments may recognize three display colors with the highest percentages and change the display color of the symbols W3 of the virtual keyboards K and K1 to K4 to one display color other than the three display colors thus recognized, and, for example, may recognize seven display colors with the highest percentages and change the display color of the symbols W3 of the virtual keyboards K and K1 to K4 to one display color other than the seven display colors thus recognized.

The input display control device 1 according to the third and fourth exemplary embodiments may change the display color of the symbols W3 of the virtual keyboards K and K1 to K4 to a complementary color of the display color with the highest percentage for example.

In the fifth exemplary embodiment, the input display control device 1 recognizes which operation button W2 has been selected, based on the contact coordinates and the tapping duration, and generates the event information indicating that the recognized operation button W2 is selected to issue the event. However, this should not be construed in a limiting sense.

The input display control device 1 may transmit the contact coordinates and the tapping duration to the server 2 so that, on the side of the server 2, the selected operation button W2 is recognized based on the contact coordinates and the tapping duration, and the event information indicating that the recognized operation button W2 is selected is generated to issue the event.

In the fifth exemplary embodiment, upon detecting that the hardware button B1 has been pressed, the display control unit 15 reads out the display color information indicating a plurality of display colors from the storage unit 14 and displays a plurality of display color candidates on the screen of the display unit 11. However, this should not be construed in a limiting sense.

The following configuration may be employed. Specifically, upon detecting that the hardware button B1 has been pressed, the display control unit 15 transmits a detection signal to the server 2 through the event transmission unit 18. Then, upon receiving the detection signal through the event reception unit 24, the execution unit 21 of the server 2 reads out the display color information stored in the storage unit 22, and transmits the display color information thus read to the input display control device 1 through the screen transmission unit 23. Upon receiving the transmitted display color information through the screen reception unit 17, the display control unit 15 may extract the display color candidates from the received display color information and may display the extracted display color candidates on the screen of the display unit 11.

The exemplary embodiments described above can be partially or entirely defined as the following supplementary notes, but are not limited to these.

(Supplementary Note 1) An input display control device including:
 a touch panel display;
 screen displaying means for displaying an image including a symbol display area in which a symbol input by a user is displayed, on a screen of the touch panel display;
 keyboard displaying means for displaying operation buttons and symbols allocated to the operation buttons on the screen of the touch panel display while being superimposed on the image displayed by the screen displaying means, the operation buttons being arrayed in a virtual keyboard through which a symbol to be displayed in the symbol display area is input through tapping on the touch panel display, the operation buttons being translucently displayed; and
 display color changing means for changing a display color of the symbols allocated to the operation buttons arrayed in the virtual keyboard displayed by the keyboard displaying means to a display color selected from a plurality of display colors set in advance.

(Supplementary Note 2) The input display control device according to Supplementary Note 1, wherein the keyboard displaying means opaquely displays the symbols allocated to the operation buttons arrayed in the virtual keyboard.

(Supplementary Note 3) The input display control device according to Supplementary Note 1 or 2, wherein the display color changing means includes:
 selection receiving means for receiving selection of one display color from the display colors set in advance, from the user; and
 selection changing means for changing the display color of the symbols allocated to the operation buttons arrayed in the virtual keyboard to the one display color received by the selection receiving means.

(Supplementary Note 4) The input display control device according to any one of Supplementary Notes 1 to 3, wherein the display color changing means includes:
 image information acquiring means for acquiring image information for generating the image to be displayed on the screen of the touch panel display by the screen displaying means;
 entire screen percentage acquiring means for acquiring a percentage of each display color used in a currently displayed screen from the image information acquired by the image information acquiring means, when the virtual keyboard is displayed entirely on the screen of the touch panel display;
 entire screen display color selecting means for recognizing a specific number of display colors with highest percentages obtained by the entire screen percentage acquiring means, and for selecting one display color other than the recognized display colors from the display colors set in advance; and
 entire screen selection changing means for changing the display color of the symbols allocated to the operation buttons arrayed in the virtual keyboard to the one display color selected by the entire screen display color selecting means.

(Supplementary Note 5) The input display control device according to Supplementary Note 4, wherein the display color changing means includes:
 area percentage acquiring means for acquiring a percentage of each display color used in an area in which the virtual keyboard is displayed from the image information acquired by the image information acquiring means, when the virtual keyboard is displayed partially on the screen of the touch panel display;
 area display color selecting means for recognizing a specific number of display colors with highest percentages obtained by the area percentage acquiring means, and for selecting one display color other than the recognized display colors from the display colors set in advance; and
 area selection changing means for changing the display color of the symbols allocated to the operation buttons arrayed in the virtual keyboard to the one display color selected by the area display color selecting means.

(Supplementary Note 6) A thin client system including:
 a server; and
 an input display control device including a touch panel display,
 the server and the input display control device being connected to each other through a network,
 the server including image transmitting means for transmitting image information for generating an image to be displayed on a screen of the touch panel display to the input display control device,
 the input display control device including:
  image receiving means for receiving the image information from the server;
  screen displaying means for displaying an image including a symbol display area in which a symbol input by a user is displayed, on the screen of the touch panel display, based on the image information received by the image receiving means;
  keyboard displaying means for displaying operation buttons and symbols allocated to the operation buttons on the screen of the touch panel display while being superimposed on the image displayed by the screen displaying means, the operation buttons being arrayed in a virtual keyboard through which a symbol to be displayed in the symbol display area is input through tapping on the touch panel display, the operation buttons being translucently displayed; and
  display color changing means for changing a display color of the symbols allocated to the operation buttons arrayed in the virtual keyboard displayed by the keyboard displaying means to a display color selected from a plurality of display colors set in advance.

(Supplementary Note 7) An input display control method performed by an input display control device including a touch panel display, the input display control method including:
 a screen display step for displaying, by the input display control device, an image including a symbol display area in which a symbol input by a user is displayed, on a screen of the touch panel display;
 a keyboard display step for displaying, by the input display control device, operation buttons and symbols allocated to the operation buttons on the screen of the touch panel display while being superimposed on the image displayed in the screen display step, the operation buttons being arrayed in a virtual keyboard through which a symbol to be displayed in the symbol display area is input through tapping on the touch panel display, the operation buttons being translucently displayed; and
 a display color changing step for changing, by the input display control device, a display color of the symbols allocated to the operation buttons arrayed in the virtual keyboard displayed in the keyboard displaying step to a display color selected from a plurality of display colors set in advance.

(Supplementary Note 8) An input display control method performed by a thin client system including a server and an input display control device including a touch panel display, the server and the input display control device being connected to each other through a network, the input display control method including:

by the server, an image transmitting step for transmitting image information for generating an image to be displayed on a screen of the touch panel display to the input display control device;

by the input display control device, an image receiving step for receiving the image information from the server;

a screen displaying step for displaying an image including a symbol display area in which a symbol input by a user is displayed, on the screen of the touch panel display, based on the image information received in the image receiving step;

a keyboard displaying step for displaying operation buttons and symbols allocated to the operation buttons on the screen of the touch panel display while being superimposed on the image displayed in the screen displaying step, the operation buttons being arrayed in a virtual keyboard through which a symbol to be displayed in the symbol display area is input through tapping on the touch panel display, the operation buttons being translucently displayed; and a display color changing step for changing a display color of the symbols allocated to the operation buttons arrayed in the virtual keyboard displayed in the keyboard displaying step to a display color selected from a plurality of display colors set in advance.

(Supplementary Note 9) A computer-readable recording medium recording therein a program for causing a computer that controls an input display control device including a touch panel display to function as:

screen displaying means for displaying an image including a symbol display area in which a symbol input by a user is displayed, on a screen of the touch panel display;

keyboard displaying means for displaying operation buttons and symbols allocated to the operation buttons on the screen of the touch panel display while being superimposed on the image displayed by the screen displaying means, the operation buttons being arrayed in a virtual keyboard through which a symbol to be displayed in the symbol display area is input through tapping on the touch panel display, the operation buttons being translucently displayed; and display color changing means for changing a display color of the symbols allocated to the operation buttons arrayed in the virtual keyboard displayed by the keyboard displaying means to a display color selected from a plurality of display colors set in advance.

Various exemplary embodiments and modifications can be made without departing from the spirit and scope of the present invention in a broader sense. The above-described exemplary embodiments are given for description of the present invention and are not intended to limit the present invention. In other words, the scope of the present invention is limited not by the exemplary embodiments but by the scope of claims. Various modifications that can be made within the scope of claims and equivalent thereto are construed to be within the scope of the present invention.

The present invention is based on Japanese Patent Application No. 2012-203202 filed on Sep. 14, 2012. The specification, the claims, and the drawings of Japanese Patent Application No. 2012-203202 are incorporated herein in their entirety by reference.

REFERENCE SIGNS LIST 1 input display control device
2 server
11 display unit
12 input unit
13 operation recognition unit
14 storage unit
15 display control unit
16 hardware button
17 screen reception unit
18 event transmission unit
21 execution unit
22 storage unit
23 screen transmission unit
24 event reception unit
30 internal bus
31 control unit
32 main storage unit
33 external storage unit
34 operation unit
35 display unit
36 timer
39 control program
100 thin client system
A symbol display area
B1 hardware button
D touch panel display
K, K1 to K4 virtual keyboard
W1 keyboard frame
W2 operation button
W3 symbol
W4 display color candidate window

The invention claimed is:

1. An input display control device comprising:
a touch panel display;
a screen display that displays an image including a symbol display area in which a symbol input by a user is displayed, on a screen of the touch panel display;
a keyboard display that displays operation buttons and symbols allocated to the operation buttons on the screen of the touch panel display while being superimposed on the image displayed by the screen display, the operation buttons being arrayed in a virtual keyboard through which a symbol to be displayed in the symbol display area is input through tapping on the touch panel display, the operation buttons being translucently displayed; and
a display color changer that changes a display color of the symbols allocated to the operation buttons arrayed in the virtual keyboard displayed by the keyboard display to a display color selected from a plurality of display colors set in advance,
wherein the display color changer comprises:
an image information acquirer that acquires image information for generating the image to be displayed on the screen of the touch panel display by the screen display,
an entire screen percentage acquirer that acquires percentages of display colors used in a currently displayed screen from the image information acquired by the image information acquirer, when the virtual key board is displayed entirely on the screen of the touch panel display,
an entire screen display color selector that recognizes a specific number of the display colors with highest percentages obtained by the entire screen percentage acquirer, and for selecting one display color other than the recognized display colors from the display colors set in advance,
an entire screen selection changer that changes the display color of the symbols allocated to the operation buttons arrayed in the virtual keyboard to the one display color selected by the entire screen display color selector, an area percentage acquirer that acquires each of percentages of display colors used in an area in which the virtual keyboard is displayed from the image information acquired by the image information acquirer, when the virtual keyboard is displayed partially on the screen of the touch panel display, an area display color selector that recognizes a specific number of the display colors with highest percentages obtained by the area percentage acquirer, and for selecting one display color other than the recognized display colors from the display colors set in advance, and an area selection changer that changes the display color of the symbols allocated to the operation buttons arrayed in the virtual keyboard to the one display color selected by the area display color selector.

2. The input display control device according to claim 1, wherein the keyboard display opaquely displays the symbols allocated to the operation buttons arrayed in the virtual keyboard.

3. The input display control device according to claim 1, wherein the display color changer includes:
   a selection receiver that receives selection of one display color from the display colors set in advance, from the user, and
   a selection changer that changes the display color of the symbols allocated to the operation buttons arrayed in the virtual keyboard to the one display color received by the selection receiver.

4. A thin client system comprising:
   a server; and
   an input display control device including a touch panel display,
   the server and the input display control device being connected to each other through a network,
   the server comprising image transmitter that transmits image information for generating an image to be displayed on a screen of the touch panel display to the input display control device,
   the input display control device comprising:
      an image receiver that receives the image information from the server;
      a screen display that displays an image including a symbol display area in which a symbol input by a user is displayed, on the screen of the touch panel display, based on the image information received by the image receiver;
      a keyboard display that displays operation buttons and symbols allocated to the operation buttons on the screen of the touch panel display while being superimposed on the image displayed by the screen display, the operation buttons being arrayed in a virtual keyboard through which a symbol to be displayed in the symbol display area is input through tapping on the touch panel display, the operation buttons being translucently displayed; and
      a display color changer that changes a display color of the symbols allocated to the operation buttons arrayed in the virtual keyboard displayed by the keyboard display to a display color selected from a plurality of display colors set in advance,
   wherein the display color changer comprises:
      an image information acquirer that acquires image information for generating the image to be displayed on the screen of the touch panel display by the screen display,
      an entire screen percentage acquirer that acquires percentages of display colors used in a currently displayed screen from the image information acquired by the image information acquirer, when the virtual key board is displayed entirely on the screen of the touch panel display,
      an entire screen display color selector that recognizes a specific number of the display colors with highest percentages obtained by the entire screen percentage acquirer, and for selecting one display color other than the recognized display colors from the display colors set in advance,
      an entire screen selection changer that changes the display color of the symbols allocated to the operation buttons arrayed in the virtual keyboard to the one display color selected by the entire screen display color selector,
      an area percentage acquirer that acquires each of percentages of display colors used in an area in which the virtual keyboard is displayed from the image information acquired by the image information acquirer, when the virtual keyboard is displayed partially on the screen of the touch panel display,
      an area display color selector that recognizes a specific number of the display colors with highest percentages obtained by the area percentage acquirer, and for selecting one display color other than the recognized display colors from the display colors set in advance, and
      an area selection changer that changes the display color of the symbols allocated to the operation buttons arrayed in the virtual keyboard to the one display color selected by the area display color selector.

5. An input display control method performed by an input display control device equipped with a touch panel display, the input display control method comprising:
   displaying, by the input display control device, an image including a symbol display area in which a symbol input by a user is displayed, on a screen of the touch panel display;
   displaying, by the input display control device, operation buttons and symbols allocated to the operation buttons on the screen of the touch panel display while being superimposed on the image displayed in the displaying of the image, the operation buttons being arrayed in a virtual keyboard through which a symbol to be displayed in the symbol display area is input through tapping on the touch panel display, the operation buttons being translucently displayed;
   changing, by the input display control device, a display color of the symbols allocated to the operation buttons arrayed in the virtual keyboard displayed in the displaying of the operation buttons and the symbols to a display color selected from a plurality of display colors set in advance;
   acquiring, by the input display control device, image information for generating the image to be displayed on the screen of the touch panel display;
   acquiring, by the input display control device, percentages of display colors used in a currently displayed screen from the image information acquired, when the virtual key board is displayed entirely on the screen of the touch panel display;
   recognizing, by the input display control device, a specific number of the display colors with highest percentages obtained, and for selecting one display color other than the recognized display colors from the display colors set in advance;

changing, by the input display control device, the display color of the symbols allocated to the operation buttons arrayed in the virtual keyboard to the one display color;

acquiring, by the input display control device, each of percentages of display colors used in an area in which the virtual keyboard is displayed from the image information acquired, when the virtual keyboard is displayed partially on the screen of the touch panel display;

recognizing, by the input display control device, a specific number of the display colors with highest percentages, and for selecting one display color other than the recognized display colors from the display colors set in advance; and changing, by the input display control device, the display color of the symbols allocated to the operation buttons arrayed in the virtual keyboard to the one display color.

6. An input display control method performed by a thin client system equipped with a server and an input display control device comprising a touch panel display, the server and the input display control device being connected to each other through a network, the input display control method comprising:

by the server, transmitting image information for generating an image to be displayed on a screen of the touch panel display to the input display control device;

by the input display control device, receiving the image information from the server;

displaying an image including a symbol display area in which a symbol input by a user is displayed, on the screen of the touch panel display, based on the image information received in the receiving of the image information;

displaying operation buttons and symbols allocated to the operation buttons on the screen of the touch panel display while being superimposed on the image displayed in the displaying of the image, the operation buttons being arrayed in a virtual keyboard through which a symbol to be displayed in the symbol display area is input through tapping on the touch panel display, the operation buttons being translucently displayed;

changing a display color of the symbols allocated to the operation buttons arrayed in the virtual keyboard displayed in the displaying of the operation buttons and symbols to a display color selected from a plurality of display colors set in advance;

acquiring image information for generating the image to be displayed on the screen of the touch panel display;

acquiring percentages of display colors used in a currently displayed screen from the image information acquired, when the virtual key board is displayed entirely on the screen of the touch panel display;

recognizing a specific number of the display colors with highest percentages obtained, and for selecting one display color other than the recognized display colors from the display colors set in advance;

changing the display color of the symbols allocated to the operation buttons arrayed in the virtual keyboard to the one display color;

acquiring each of percentages of display colors used in an area in which the virtual keyboard is displayed from the image information acquired, when the virtual keyboard is displayed partially on the screen of the touch panel display;

recognizing a specific number of the display colors with highest percentages, and for selecting one display color other than the recognized display colors from the display colors set in advance; and changing the display color of the symbols allocated to the operation buttons arrayed in the virtual keyboard to the one display color.

7. A non-transitory computer-readable that stores therein a program for causing a computer that controls an input display control device comprising a touch panel display to function as:

a screen display that displays an image including a symbol display area in which a symbol input by a user is displayed, on a screen of the touch panel display;

a keyboard display that displays operation buttons and symbols allocated to the operation buttons on the screen of the touch panel display while being superimposed on the image displayed by the screen display, the operation buttons being arrayed in a virtual keyboard through which a symbol to be displayed in the symbol display area is input through tapping on the touch panel display, the operation buttons being translucently displayed; and a display color changer that changes a display color of the symbols allocated to the operation buttons arrayed in the virtual keyboard displayed by the keyboard display to a display color selected from a plurality of display colors set in advance, wherein the display color changer comprises:

an image information acquirer that acquires image information for generating the image to be displayed on the screen of the touch panel display by the screen display, an entire screen percentage acquirer that acquires percentages of display colors used in a currently displayed screen from the image information acquired by the image information acquirer, when the virtual key board is displayed entirely on the screen of the touch panel display, an entire screen display color selector that recognizes a specific number of the display colors with highest percentages obtained by the entire screen percentage acquirer, and for selecting one display color other than the recognized display colors from the display colors set in advance, an entire screen selection changer that changes the display color of the symbols allocated to the operation buttons arrayed in the virtual keyboard to the one display color selected by the entire screen display color selector, an area percentage acquirer that acquires each of percentages of display colors used in an area in which the virtual keyboard is displayed from the image information acquired by the image information acquirer, when the virtual keyboard is displayed partially on the screen of the touch panel display, an area display color selector that recognizes a specific number of the display colors with highest percentages obtained by the area percentage acquirer, and for selecting one display color other than the recognized display colors from the display colors set in advance, and an area selection changer that changes the display color of the symbols allocated to the operation buttons arrayed in the virtual keyboard to the one display color selected by the area display color selector.

* * * * *